(12) United States Patent
Yerramalli et al.

(10) Patent No.: US 10,812,982 B2
(45) Date of Patent: Oct. 20, 2020

(54) AUTONOMOUS UPLINK TRANSMISSION IN UNLICENSED SPECTRUM

(71) Applicant: QUALCOMM Incorporated, San Diego, CA (US)

(72) Inventors: Srinivas Yerramalli, San Diego, CA (US); Tao Luo, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 15/416,923

(22) Filed: Jan. 26, 2017

(65) Prior Publication Data
US 2017/0230838 A1    Aug. 10, 2017

Related U.S. Application Data

(60) Provisional application No. 62/292,102, filed on Feb. 5, 2016.

(51) Int. Cl.
*H04W 16/14*    (2009.01)
*H04W 74/08*    (2009.01)
(Continued)

(52) U.S. Cl.
CPC ........... *H04W 16/14* (2013.01); *H04L 1/1861* (2013.01); *H04L 5/0048* (2013.01);
(Continued)

(58) Field of Classification Search
CPC ............... H04W 16/14; H04W 72/042; H04W 72/0446; H04W 74/0808; H04W 24/10;
(Continued)

(56) References Cited

U.S. PATENT DOCUMENTS 6,115,390 A * 9/2000 Chuah ................... H04L 1/1607
370/348
2015/0098397 A1    4/2015 Damnjanovic et al.
(Continued)

FOREIGN PATENT DOCUMENTS

WO   WO-2013126858 A1    8/2013
WO   WO-2016017327 A1    2/2016

OTHER PUBLICATIONS

ISA/EP, International Search Report and Written Opinion of the International Searching Authority, Int'l Application No. PCT/US2017/015443, dated Apr. 20, 2017, European Patent Office, Rijswijk, NL, 13 pgs.

*Primary Examiner* — Natasha W Cosme
(74) *Attorney, Agent, or Firm* — Liem T. Do

(57) ABSTRACT

Methods, systems, and devices for wireless communication are described. A user equipment (UE) operating in unlicensed spectrum may determine that a base station is not transmitting during a particular time period (e.g., by detecting the absence of a control signal). The UE may then perform a listen-before-talk (LBT) procedure and, if the channel is available, may perform an autonomous uplink (UL) transmission. The autonomous UL transmission may include control information to facilitate decoding. Thus, the base station may receive the control information, and decode the rest of the autonomous UL transmission accordingly. The base station may configure the UE for autonomous UL transmissions when the radio link is established, and may also send dynamic configuration information to initiate, suspend, or reconfigure parameters for autonomous UL transmissions.

28 Claims, 18 Drawing Sheets

(51) Int. Cl.
*H04L 1/18* (2006.01)
*H04L 5/00* (2006.01)
*H04W 72/04* (2009.01)

(52) U.S. Cl.
CPC ..... *H04W 72/042* (2013.01); *H04W 72/0453* (2013.01); *H04W 74/0808* (2013.01); *H04W 74/0816* (2013.01)

(58) Field of Classification Search
CPC . H04W 72/04; H04W 72/12; H04W 74/0816; H04W 48/16; H04W 48/12; H04W 56/001; H04W 72/0406; H04W 72/0413; H04W 72/0453; H04W 72/1215; H04W 74/08; H04W 88/02; H04W 72/085; H04W 72/14; H04W 88/08; H04L 5/0048; H04L 5/0053; H04L 5/001; H04L 27/0006; H04L 5/00; H04L 5/005; H04L 5/0007; H04L 5/0055; H04L 5/0035; H04L 5/1469; H04L 1/1861; H04L 5/0044; H04L 5/0091; H04L 5/0094; H04L 1/00; H04L 5/0092; H04L 5/0098; H04L 1/1812; H04L 1/1896; H04L 27/2601

See application file for complete search history.

(56) References Cited

U.S. PATENT DOCUMENTS

| | | |
|---|---|---|
| 2015/0351121 A1 | 12/2015 | Luo et al. |
| 2016/0233989 A1* | 8/2016 | Belghoul ................. H04L 5/14 |
| 2016/0302076 A1* | 10/2016 | Chou .................... H04W 16/14 |
| 2017/0265225 A1* | 9/2017 | Takeda ................. H04W 16/14 |
| 2019/0110310 A1* | 4/2019 | Obregon ........... H04W 72/1284 |

\* cited by examiner

AUTONOMOUS UPLINK TRANSMISSION IN UNLICENSED SPECTRUM

CROSS REFERENCES

The present Application for Patent claims priority to U.S. Provisional Patent Application No. 62/292,102 by Yerramalli, et al., entitled "AUTONOMOUS UPLINK TRANSMISSION IN UNLICENSED SPECTRUM," filed Feb. 5, 2016, assigned to the assignee hereof.

BACKGROUND

The following relates generally to wireless communication, and more specifically to autonomous uplink (UL) transmission in unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Base stations and UEs may operate in both licensed and unlicensed spectrum. In some cases, devices operating in unlicensed spectrum may not be guaranteed access to the medium at any particular time, which may interfere with the scheduling of transmissions, particularly UL transmissions. Scheduling disruptions may result in delays, latency, and reduced throughput.

SUMMARY

A user equipment (UE) operating in unlicensed spectrum may determine that a base station is not transmitting during a particular time period (e.g., by detecting the absence of a control signal). The UE may then perform a listen-before-talk (LBT) procedure and, if the channel is available, may perform an autonomous uplink (UL) transmission. The autonomous UL transmission may include control information to facilitate decoding. Thus, the base station may receive the control information, and decode the rest of the autonomous UL transmission accordingly. The base station may configure the UE for autonomous UL transmissions when the radio link is established, and may also send dynamic configuration information to initiate, suspend, or reconfigure parameters for autonomous UL transmissions.

A method of wireless communication is described. The method may include detecting an absence of a control transmission from a base station on a component carrier (CC) in an unlicensed radio frequency (RF) spectrum band at a predefined time, performing a LBT procedure based at least in part on the detected absence of the control transmission and transmitting an unscheduled UL message on the CC based at least in part on the LBT procedure.

An apparatus for wireless communication is described. The apparatus may include means for detecting an absence of a control transmission from a base station on a CC in an unlicensed RF spectrum band at a predefined time, means for performing a LBT procedure based at least in part on the detected absence of the control transmission and means for transmitting an unscheduled UL message on the CC based at least in part on the LBT procedure.

A further apparatus is described. The apparatus may include a processor, memory in electronic communication with the processor, and instructions stored in the memory. The instructions may be operable to cause the processor to detect an absence of a control transmission from a base station on a CC in an unlicensed RF spectrum band at a predefined time, perform a LBT procedure based at least in part on the detected absence of the control transmission and transmit an unscheduled UL message on the CC based at least in part on the LBT procedure.

A non-transitory computer readable medium for wireless communication is described. The non-transitory computer-readable medium may include instructions to cause a processor to detect an absence of a control transmission from a base station on a CC in an unlicensed RF spectrum band at a predefined time, perform a LBT procedure based on the detected absence of the control transmission and transmit an unscheduled UL message on the CC based on the LBT procedure.

In some examples of the method, apparatus, or non-transitory computer-readable medium described above, the control transmission comprises a cell-specific reference signal (CRS), a common physical downlink control channel (PDCCH) transmission, or both.

In some examples of the method, apparatus, or non-transitory computer-readable medium described above, the predefined time comprises a first symbol of a subframe, the LBT procedure is performed during the subframe, and the unscheduled UL message is transmitted during the subframe.

Some examples of the method, apparatus, or non-transitory computer-readable medium described above may further include processes, features, means, or instructions for determining an LBT window based on a slot number, a subframe number, a radio network temporary identity (RNTI), or any combination thereof, where the LBT procedure is performed during the LBT window.

Some examples of the method, apparatus, or non-transitory computer-readable medium described above may further include processes, features, means, or instructions for identifying a probabilistic transmission parameter, where the unscheduled UL message is transmitted based on the probabilistic transmission parameter. Some examples of the method, apparatus, or non-transitory computer-readable medium described above may further include processes, features, means, or instructions for identifying a received signal strength indication (RSSI), where the unscheduled UL message is transmitted based on the RSSI.

Some examples of the method, apparatus, or non-transitory computer-readable medium described above may further include processes, features, means, or instructions for determining whether the base station has transmitted on another CC, where the unscheduled UL message is transmitted based on the determination. Some examples of the method, apparatus, or non-transitory computer-readable medium described above may further include processes, features, means, or instructions for receiving a dynamic autonomous UL transmission indication from the base station, where the unscheduled UL message is transmitted based on the dynamic autonomous UL transmission indication.

Some examples of the method, apparatus, or non-transitory computer-readable medium described above may further include processes, features, means, or instructions for determining whether an UL buffer status is below a threshold, where the unscheduled UL message is transmitted based on the determination.

In some examples of the method, apparatus, or non-transitory computer-readable medium described above, the unscheduled UL message comprises an UL control information (UCI) portion and a data portion, where the UCI portion comprises modulation and coding scheme (MCS) information, scrambling information, hybrid automatic repeat request (HARQ) process information, or any combination thereof. In some examples of the method, apparatus, or non-transitory computer-readable medium described above, the data portion is transmitted using a time first transmission scheme.

In some examples of the method, apparatus, or non-transitory computer-readable medium described above, the UCI portion is transmitted using punctured resource elements (REs) within the data portion.

Some examples of the method, apparatus, or non-transitory computer-readable medium described above may further include processes, features, means, or instructions for receiving a an autonomous UL configuration message from the base station, where the autonomous UL configuration message comprises a scrambling identification (ID), a multiple-input multiple-output (MIMO) indication, a maximum number of autonomous UL subframes, a set of subframes for autonomous UL transmission, a partial subframe indication, an end position indication, or any combination thereof.

Some examples of the method, apparatus, or non-transitory computer-readable medium described above may further include processes, features, means, or instructions for determining that data for an UL HARQ process has been transmitted during an UL burst and that that a grant for the UL HARQ process has not been received following the UL burst. Some examples of the method, apparatus, or non-transitory computer-readable medium described above may further include processes, features, means, or instructions for refraining from including data corresponding to the UL HARQ process within the unscheduled UL message based on the determination.

Some examples of the method, apparatus, or non-transitory computer-readable medium described above may further include processes, features, means, or instructions for determining that data for an UL HARQ process has been in a buffer for a threshold time period. Some examples of the method, apparatus, or non-transitory computer-readable medium described above may further include processes, features, means, or instructions for including data corresponding to the UL HARQ process within the unscheduled UL message based on the determination.

Some examples of the method, apparatus, or non-transitory computer-readable medium described above may further include processes, features, means, or instructions for determining whether the transmission of the unscheduled UL message is power limited. An MCS of the unscheduled UL message, a bandwidth of the unscheduled UL message, a number of interlaces for the unscheduled UL message, or any combination thereof may be based at least in part the determination.

Some examples of the method, apparatus, or non-transitory computer-readable medium described above may further include processes, features, means, or instructions for identifying a traffic priority for the unscheduled UL message, where the traffic priority is based on a quality of service (QoS) class indicator (QCI) and the unscheduled UL message is transmitted based on the traffic priority.

Some examples of the method, apparatus, or non-transitory computer-readable medium described above may further include processes, features, means, or instructions for receiving an acknowledgement (ACK) or a negative acknowledgement (NACK) in a physical HARQ indicator channel (PHICH) transmission or a UE specific PDCCH transmission.

A method of wireless communication is described. The method may include receiving an unscheduled UL message from a UE, wherein the unscheduled UL message comprises a UCI portion and a data portion, identifying one or more transmission parameters based at least in part on the UCI portion and decoding the data portion using the one or more transmission parameters.

An apparatus for wireless communication is described. The apparatus may include means for receiving an unscheduled UL message from a UE, wherein the unscheduled UL message comprises a UCI portion and a data portion, means for identifying one or more transmission parameters based at least in part on the UCI portion and means for decoding the data portion using the one or more transmission parameters.

A further apparatus is described. The apparatus may include a processor, memory in electronic communication with the processor, and instructions stored in the memory. The instructions may be operable to cause the processor to receive an unscheduled UL message from a UE, wherein the unscheduled UL message comprises a UCI portion and a data portion, identify one or more transmission parameters based at least in part on the UCI portion and decode the data portion using the one or more transmission parameters.

A non-transitory computer readable medium for wireless communication is described. The non-transitory computer-readable medium may include instructions to cause a processor to receive an unscheduled UL message from a UE, where the unscheduled UL message comprises a UCI portion and a data portion, identify one or more transmission parameters based on the UCI portion and decode the data portion using the one or more transmission parameters.

In some examples of the method, apparatus, or non-transitory computer-readable medium described above, the UCI portion comprises MCS information, scrambling information, HARQ process information, or any combination thereof.

Some examples of the method, apparatus, or non-transitory computer-readable medium described above may further include processes, features, means, or instructions for transmitting a dynamic autonomous UL transmission indication to the UE, where the unscheduled UL message is received based on the dynamic autonomous UL transmission indication. Some examples of the method, apparatus, or non-transitory computer-readable medium described above may further include processes, features, means, or instructions for transmitting a probabilistic transmission parameter to the UE, where the unscheduled UL message is received based on the probabilistic transmission parameter.

A method of wireless communication is described. The method may include transmitting an autonomous UL configuration message to a UE and receiving an unscheduled UL message from the UE based at least in part on the autonomous UL configuration message.

An apparatus for wireless communication is described. The apparatus may include means for transmitting an autonomous UL configuration message to a UE and means for receiving an unscheduled UL message from the UE based at least in part on the autonomous UL configuration message.

A further apparatus is described. The apparatus may include a processor, memory in electronic communication with the processor, and instructions stored in the memory. The instructions may be operable to cause the processor to transmit an autonomous UL configuration message to a UE and receive an unscheduled UL message from the UE based at least in part on the autonomous UL configuration message.

A non-transitory computer readable medium for wireless communication is described. The non-transitory computer-readable medium may include instructions to cause a processor to transmit an autonomous UL configuration message to a UE and receive an unscheduled UL message from the UE based on the autonomous UL configuration message.

In some examples of the method, apparatus, or non-transitory computer-readable medium described above, the autonomous UL configuration message comprises a scrambling ID, a MIMO indication, a maximum number of autonomous UL subframes, a set of subframes for autonomous UL transmission, a partial subframe indication, an end position indication, a traffic priority or any combination thereof.

DETAILED DESCRIPTION

A user equipment (UE) operating in unlicensed spectrum may perform autonomous (i.e., unscheduled) uplink (UL) transmissions. The UE may determine that a base station is not transmitting during a particular time period (e.g., by detecting the absence of a control signal). The UE may then perform a listen-before-talk (LBT) procedure and, if the channel is available, may perform an autonomous UL transmission. The autonomous UL transmission may include control information to facilitate decoding. Thus, the base station may receive the control information, and decode the rest of the autonomous UL transmission accordingly. The base station may configure the UE for autonomous UL transmissions when the radio link is established, and may also send dynamic configuration information to initiate, suspend, or reconfigure parameters for autonomous UL transmissions.

In some cases, base stations or UEs may employ means to reduce the number of UL transmissions from different UEs. For example, a base station may configure a UE with a probabilistic transmission parameter, autonomous UL may be toggled on and off, and transmission may be contingent on signal strength or transmission on other component carriers (CCs). A UE may determine what to transmit using autonomous UL transmission based on a number of factors. For example, the content of the transmissions may be based on power limitations, HARQ status, or other factors.

Aspects of the disclosure are initially described in the context of a wireless communication system. Subsequent figures illustrate a subframe configuration and process flow for autonomous UL transmissions. Aspects of the disclosure are further illustrated by and described with reference to apparatus diagrams, system diagrams, and flowcharts that relate to autonomous UL transmission in unlicensed spectrum.

Figure 1:
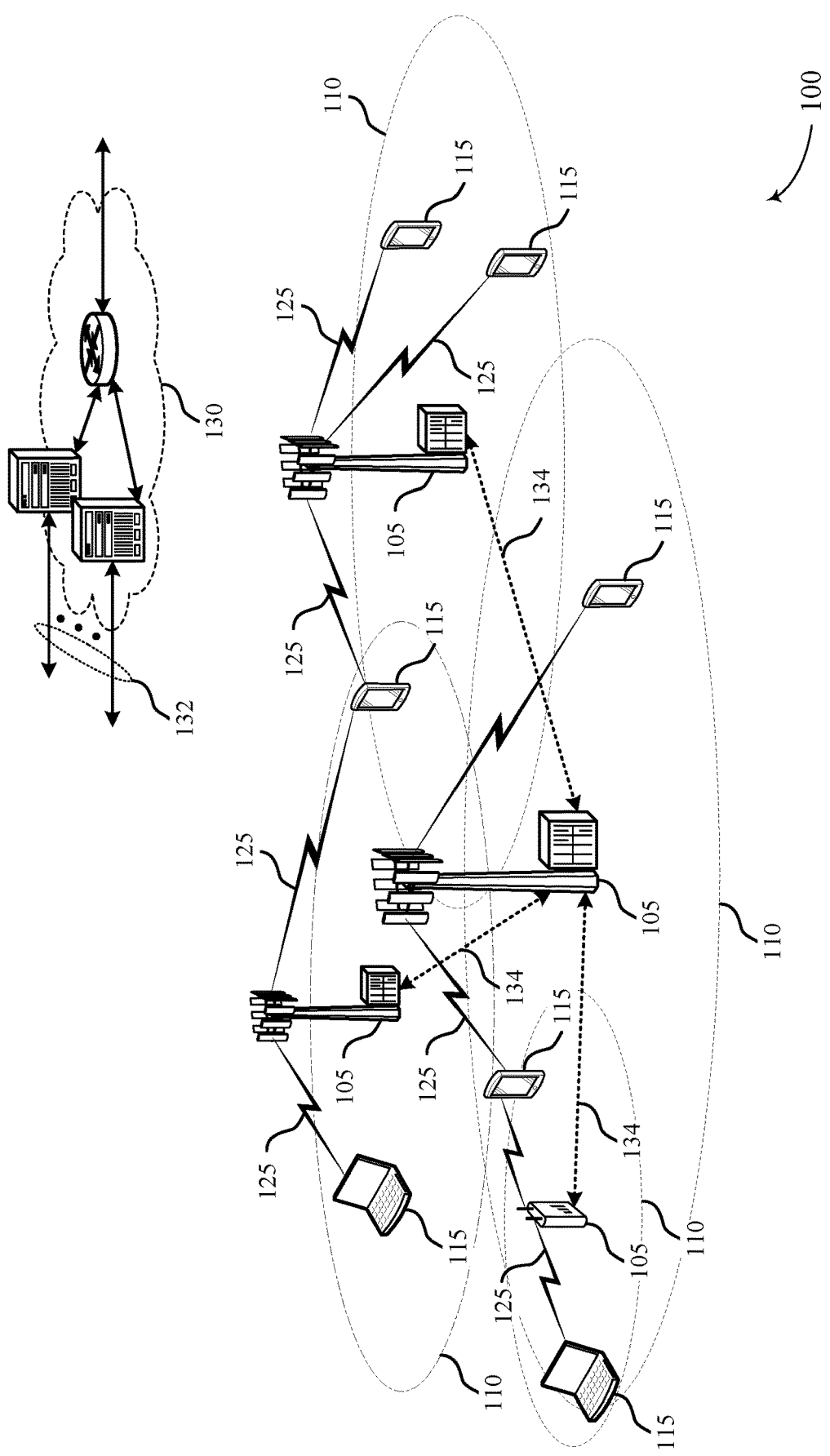
FIG. 1 illustrates an example of a wireless communications system that supports autonomous uplink (UL) transmission in unlicensed spectrum in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support autonomous UL transmissions by UEs 115 operating in unlicensed spectrum.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless system 100 may utilize both licensed and unlicensed radio frequency spectrum bands. For example, wireless system 100 may employ LTE License Assisted Access (LTE-LAA) or LTE Unlicensed (LTE-U) radio access technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with CCs operating in a licensed band. Operations in unlicensed spectrum may include DL transmissions, UL transmissions, or both. Duplexing in unlicensed spectrum may be based on frequency division duplexing (FDD), time division duplexing (TDD) or a combination of both.

UEs 115 or base stations 105 may operating in a shared or unlicensed frequency spectrum may perform a LBT procedure such as a clear channel assessment (CCA) prior to communicating in order to determine whether the channel is available. A CCA may include an energy detection procedure to determine whether there are any other active transmissions. For example, the device may infer that a change in a RSSI of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. In some cases, a UE 115 may perform an LBT prior to performing an autonomous UL transmission.

In some cases, UL transmissions in unlicensed spectrum (e.g., in LTE-U or LAA) may be scheduled by a base station 105. An UL grant may indicate scheduled resources to be used by a UE 115 for UL transmission. UL grants may be cross-carrier scheduled or self-scheduled. If grants are self-scheduled, there may be a delay (e.g., a 4 ms gap) between the UL grant and UL transmission. If grants are cross-carrier scheduled, the UE 115 may perform an LBT procedure (e.g., a Cat 4 LBT). The UE 115 may perform an LBT procedure with a small window size (e.g., with a contention window (CW) size smaller than that of a DL LBT CW). The window size may be determined as a function of the UE radio network temporary identification (RNTI) and the slot or subframe number. The RNTI based determination may reduce collision probability across UEs 115. Without scheduling from a base station 105, UEs 115 may have an increased probability of transmission collisions. If the base station 105 is not transmitting on the DL, several UEs 115 may independently contend for UL transmission. In other cases, UEs 115 may miss DL transmissions from a base station 105 due to bursty interference, insufficient signal-to-noise ratio (SNR), etc. Missed DL transmissions may also increase the probability of transmission collisions.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

HARQ may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125. In some cases, UL control messages including HARQ information may be transmitted autonomously by a UE 115. HARQ process may also be configured in these autonomous (i.e., unscheduled) UL transmissions.

Downlink control information (DCI), including HARQ information, is transmitted in a physical downlink control channel (PDCCH) carries DCI in at least one control channel elements CCE, which may consist of nine logically contiguous resource element groups (REGs), where each REG contains 4 resource elements. DCI includes information regarding DL scheduling assignments, UL resource grants, transmission scheme, UL power control, HARQ information, MCS and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI includes additional signaling information. DCI size and format depend on the amount of information as well as factors such as bandwidth, the number of antenna ports, and duplexing mode.

When a UE 115 transmits autonomous UL messages, the transmissions may include UL control information (UCI) that contains parameters similar to those included in DCI because the receiving base station 105 may use the UCI to facilitate decoding of the message.

Thus, a UE 115 operating in unlicensed spectrum may determine that a base station 105 is not transmitting during a particular time period (e.g., by detecting the absence of a control signal). The UE may then perform an LBT procedure and, if the channel is available, may perform an UL transmission. The autonomous UL transmission may include control information to facilitate decoding. The base station 105 may receive the control information, and decode the rest of the autonomous UL transmission accordingly. The base station 105 may configure the UE 115 for autonomous UL transmissions when the radio link is established, and may also send dynamic configuration information to initiate, suspend, or reconfigure parameters for autonomous UL transmissions.

Figure 2:
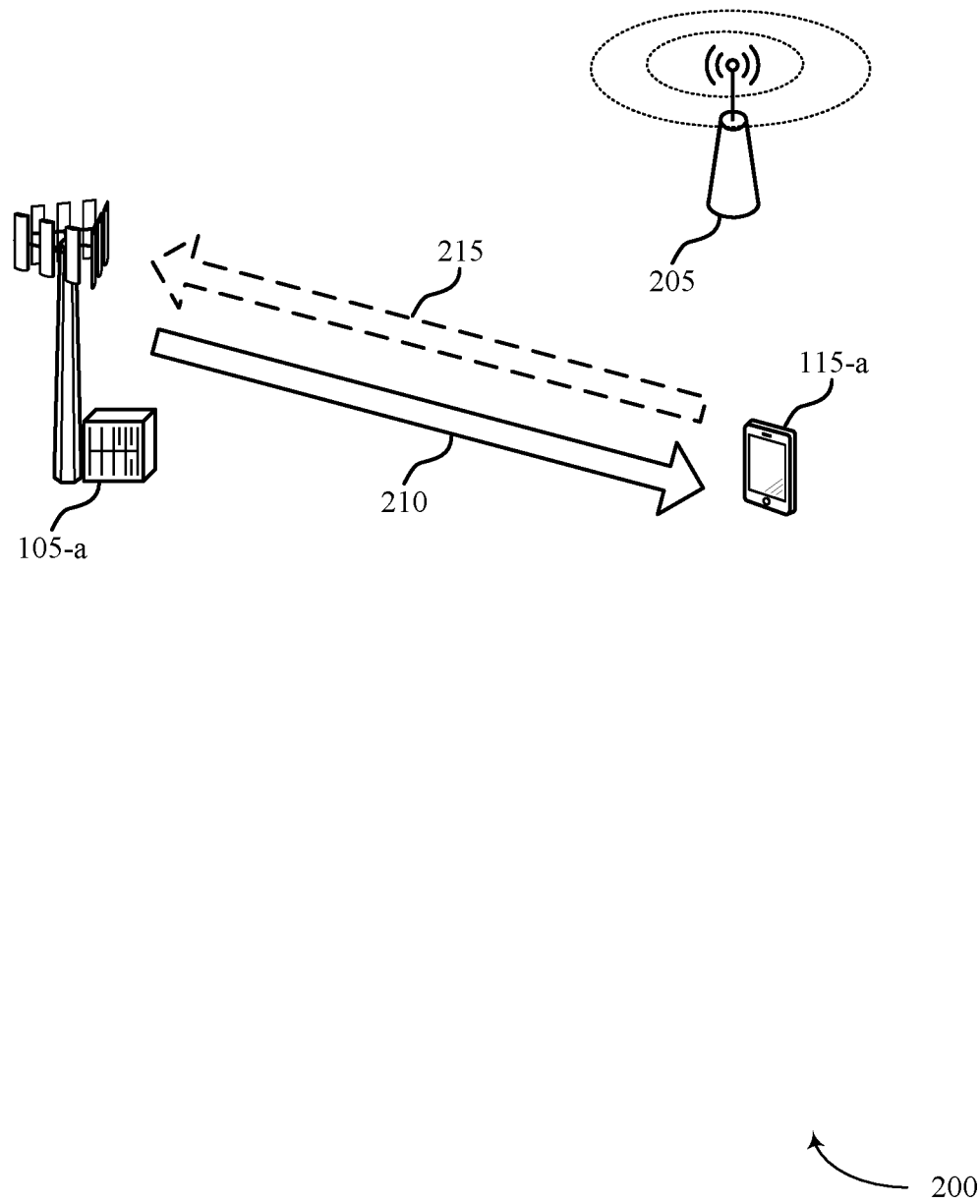
FIG. 2 illustrates an example of a wireless communications system that supports autonomous UL transmission in unlicensed spectrum in accordance with aspects of the present disclosure.

FIG. 2 illustrates an example of a wireless communications system 200 for autonomous UL transmission in unlicensed spectrum. Wireless communications system 200 may include base station 105-a and UE 115-a, which may be examples of the corresponding devices described with reference to FIG. 1. Wireless communications system 200 may operate in unlicensed spectrum that may also be used by other wireless devices such as a wireless local area network access point (AP) 205. Wireless communications system 200 may support autonomous UL transmissions by UE 115-a when operating in the unlicensed spectrum. Base station 105-a may configure UE 115-a for autonomous UL transmissions using a DL CC 210 (which may utilize either licensed or unlicensed spectrum). UE 115-a may perform the autonomous UL transmissions using UL CC 215, which utilizes unlicensed spectrum.

Prior to transmitting, UE 115-a may determine that a base station is not transmitting during a particular time period (e.g., by detecting the absence of a control signal). UE 115-a may then perform an LBT procedure and, if the channel is available, may perform an autonomous UL transmission. The autonomous UL transmission may include control information to facilitate decoding. Thus, the base station may receive the control information and decode the rest of the autonomous UL transmission accordingly. Base station 105-a may configure UE 115-a for autonomous UL transmissions when the radio link is established, and may also send dynamic configuration information to initiate, suspend, or reconfigure parameters for autonomous UL transmissions.

In some cases, base station 105-a or UE 115-a may employ means to control the number of UL transmissions from different UEs. For example, base station 105-a may configure UE 115-a with a probabilistic transmission parameter. In some cases, the probabilistic transmission parameter may include a number of additional slots UE 115-a may wait before transmitting an UL message (e.g., to prevent intra-cell UE collision). Once UE 115-a wins contention (e.g., a CCA counter is zero), UE 115-a may transmit with a probability (e.g., 70%) defined by the UL probabilistic transmission parameter and may not transmit on the rest of the occasions. In some cases, the more UEs 115 contending for access, the lower the configured UL probabilistic transmission parameter. In other examples, if UE 115-a measured received signal strength indicator (RSSI) on symbol 0 is greater than an average RSSI plus a radio resource control (RRC) configured delta value, UE 115-a may not transmit on the UL. Further, if UE 115-a is configured with multiple carriers and detects DL transmission on other LAA carriers but not on the current secondary cell (SCell), then UE 115-a may not transmit on the UL. A toggling indication (e.g., a one-bit field) in common or UE-specific signaling (e.g., PDCCH or physical HARQ indicator channel (PHICH)) may dynamically enable or disable autonomous UL transmission capabilities. Autonomous transmission may also be disabled when the UE UL buffer is below a threshold configured by base station 105-a.

UE 115-a may determine what to transmit using autonomous UL transmission based on a number of factors. If data corresponding to an UL HARQ processes has been transmitted as part of a previous UL burst but base station 105-a did not have an opportunity to transmit new UL grants afterwards, the HARQ processes may be ignored. If data corresponding to some HARQ process is in the buffer beyond a configured timer, UE 115-a may transmit the data. If UE 115-a is not power limited, it may use the entire bandwidth for UL transmission with the lowest possible modulation coding scheme (MCS). If UE 115-a is power limited, it may reduce the number of interlaces used for transmission after reaching the minimum MCS. In some cases, UE 115-a may determine power limitation based on an RSSI measurement in a discovery reference signal (DRS) and/or in a CRS measurement in previous downlink subframes (e.g., in the previous 2-3 DL subframes). Quality of Service class identifier (QCI) based traffic priority may be configured by base station 105-a independently for the autonomous UL transmission.

Base station 105-a may configure UE 115-a with parameters for autonomous UL transmission. In some examples, an RRC message, such as an RRC setup, configuration or reconfiguration message, may contain indications and parameter configuration information. A reference signal scrambling ID (e.g., a sounding reference signal (SRS) scrambling ID) may be used whether UL multiple input multiple output (MIMO) is utilized or not. Further, parameters may include a maximum number of subframes that may be transmitted autonomously, in addition to an identification of subframes on which a UE may contend for autonomous UL transmission (e.g., even subframes, odd subframes, etc.). An indication may also identify whether the last subframe transmitted is a full or partial subframe. If the last subframe transmitted is a partial subframe, the end position may also be indicated.

UCI may be transmitted to base station 105-a for decoding of a subsequent UL transmission. The UCI may have a format similar to downlink control information (DCI) and may include a MCS, scrambling information, HARQ configuration information, or other information to decode the subsequent UL transmission from UE 115-a. UE 115-a may transmit physical uplink shared channel (PUSCH) with regular time first, frequency next mapping. UCI may be scheduled on physical uplink control channel (PUCCH) or on a new channel. UCI may contain control information used by base station 105-a to process the UL transmission. New encoding for PUCCH may accommodate partial subframe transmission. One UCI format may be used to reduce decoding complexity at base station 105-a. A configured number of PUSCH resources may be punctured to provide UCI to base station 105-a. Optional transmission of UCI on PUCCH may be radio resource control (RRC) configured by base station 105-a.

In some cases, base station 105-a may acknowledge a successful autonomous UL transmission. For example, the next DL transmission burst may use some bits in the PHICH or in UE specific PDCCH (e.g., with the new DCI format) to indicate the success or failure of the UL transmission.

Figure 3:
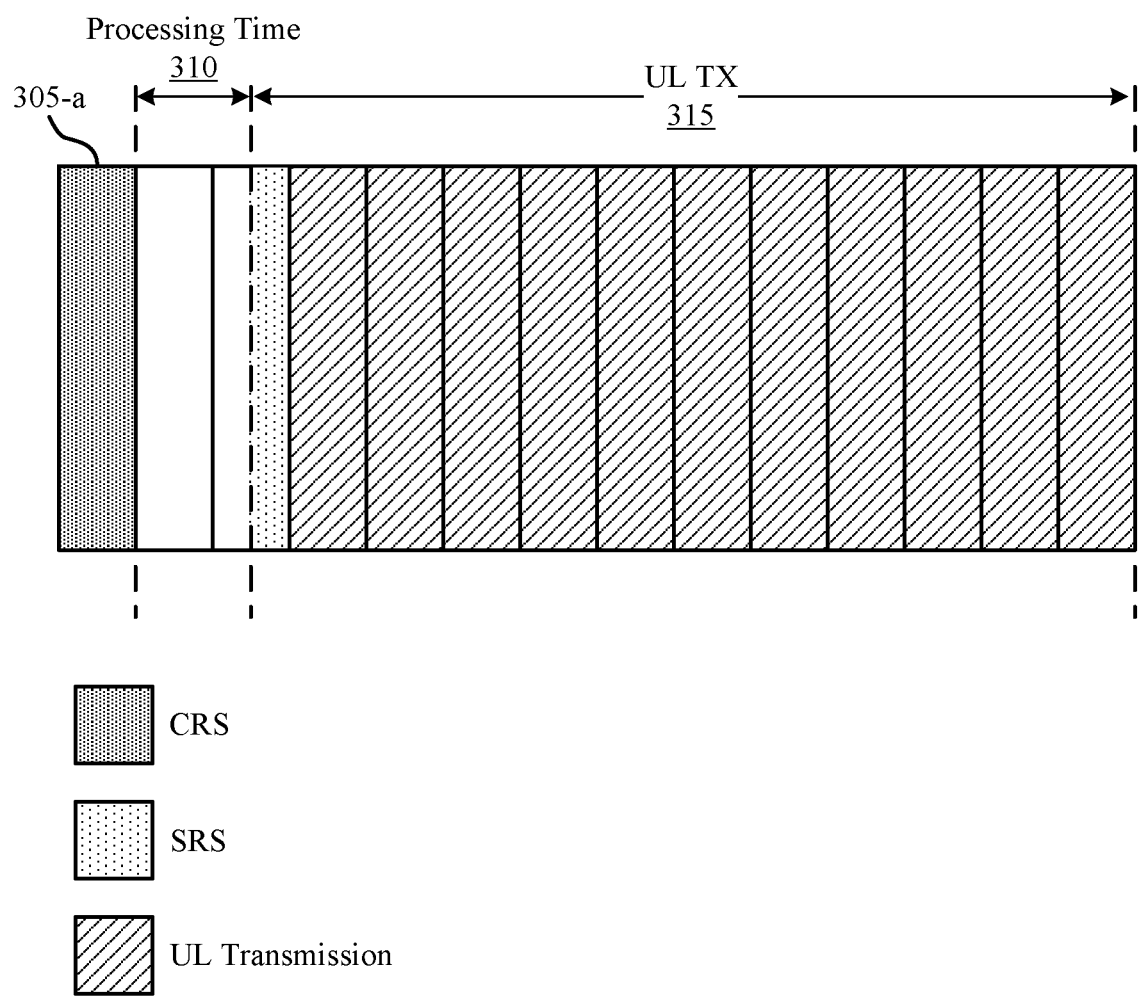
FIG. 3 illustrates an example of a subframe configuration that supports autonomous UL transmission in unlicensed spectrum in accordance with aspects of the present disclosure.

FIG. 3 illustrates an example of a subframe configuration 300 for autonomous UL transmission in unlicensed spectrum. In some cases, subframe configuration 300 may represent aspects of techniques performed by a UE 115 or base station 105 as described with reference to FIGS. 1-2.

A UE 115 may look for a CRS in symbol 305-a (e.g., symbol 0 of the subframe). If the UE 115 does not detect CRS in symbol 305-a, the UE 115 may perform an LBT procedure during a processing time 310 following symbol 305-a. The processing time 310 may last a one or more symbol periods (e.g., 2 or 3 symbols).

Following a successful LBT, the UE 115 may begin UL transmission 315. A reference signal (e.g., similar to a SRS) may be included at the beginning of UL transmission 315 to indicate the presence of the transmission and, in some cases, to facilitate decoding. The reference signal may allow a base station 105 to detect UL transmission 315 and identify the transmitting UE 115.

Figure 4:
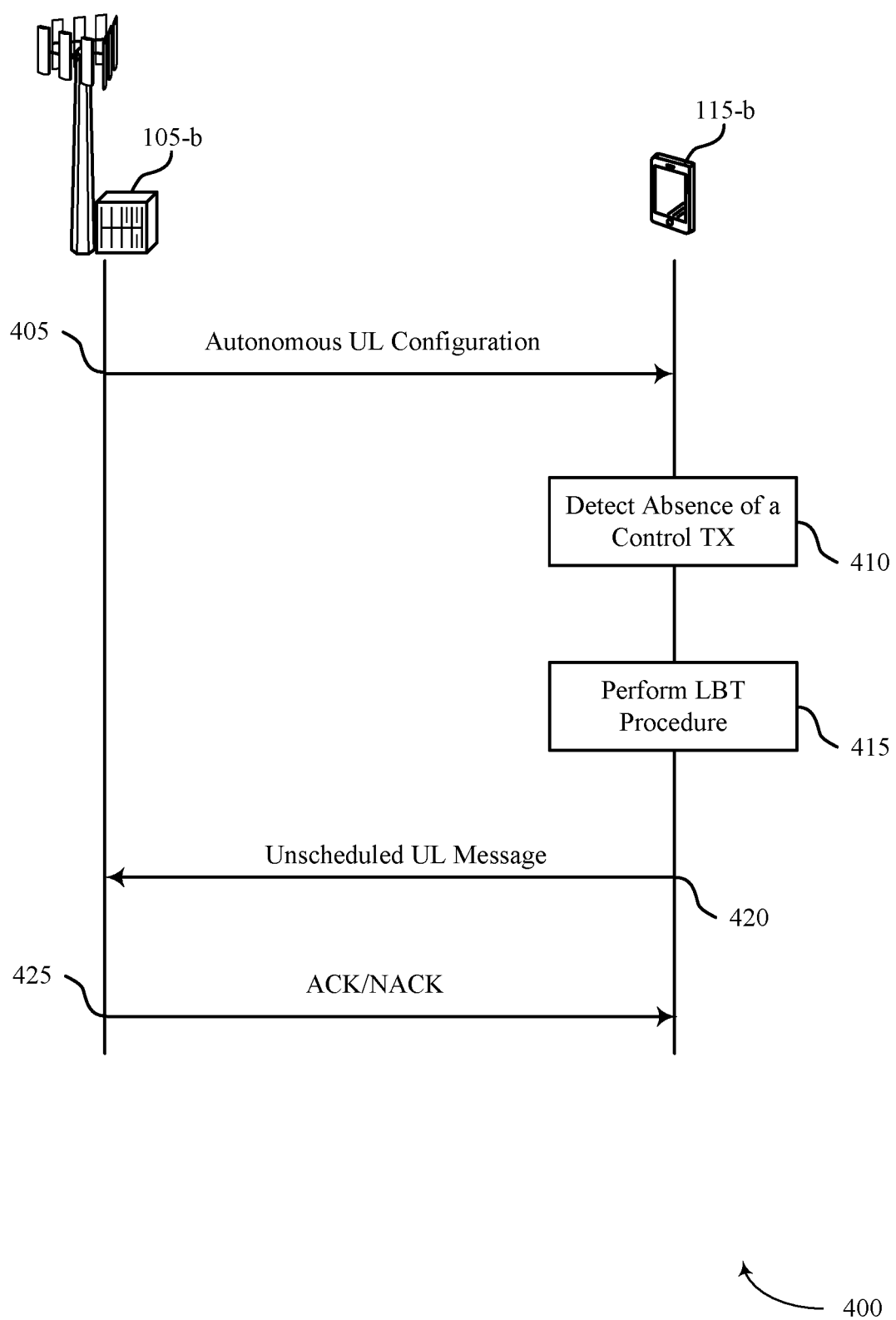
FIG. 4 illustrates an example of a process flow in a system that supports autonomous UL transmission in unlicensed spectrum in accordance with aspects of the present disclosure.

FIG. 4 illustrates an example of a process flow 400 for autonomous UL transmission in unlicensed spectrum in accordance with various aspects of the present disclosure. Process flow 400 may include base station 105-b and UE 115-b, which may be examples of the corresponding devices described with reference to FIG. 1-2.

At step 405, base station 105-b may transmit one or more autonomous UL configuration messages to UE 115-b (e.g., in RRC configuration signaling). Subsequent autonomous UL transmissions may be sent in accordance with the autonomous UL configuration message. The autonomous UL configuration message may include a scrambling ID, a MIMO indication, a maximum number of autonomous UL subframes, a set of subframes for autonomous UL transmission, a partial subframe indication, an end position indication, or any combination of thereof.

At step 410, UE 115-b may detect the absence of a control transmission from base station 105-b on a CC in an unlicensed band. The (absent) control transmission may be a CRS, a PDCCH transmission, or both. The detected absence may be based on lack of control information in the first symbol of a subframe.

At step 415, UE 115-b may perform an LBT procedure. The LBT procedure may be performed during the subframe in which the control signal was absent. The LBT procedure may be performed during an LBT window. A slot number, subframe number, or RNTI may determine the size of the LBT window.

At step 420, UE 115-b may transmit an unscheduled UL message on the unlicensed band (e.g., if the LBT is successful). The UL message may be transmitted during the subframe in which the LBT procedure was performed. A UCI portion and a data portion may be included in the unscheduled UL message. The UCI portion may include MCS information, scrambling information, HARQ process information, or other information to facilitate decoding of the data portion. In some cases, punctured resource elements within the data portion may be used to transmit the UCI portion. In some cases, the unscheduled UL message may be transmitted according to a probabilistic transmission parameter, an RSSI, traffic priority, or a status of an UL buffer. The probabilistic transmission parameter may include a number of additional slots UE 115-b may wait before transmitting the UL message (e.g., to prevent intra-cell UE collision). In other cases, the unscheduled UL message may not be transmitted based on a determination that the base station has transmitted on another CC.

At step 405, base station 105-b may transmit an ACK for the unscheduled UL message. If the transmission is unsuccessful, base station 105-b may transmit a NACK, or it may not be aware of the transmission and may not respond.

Figure 5:
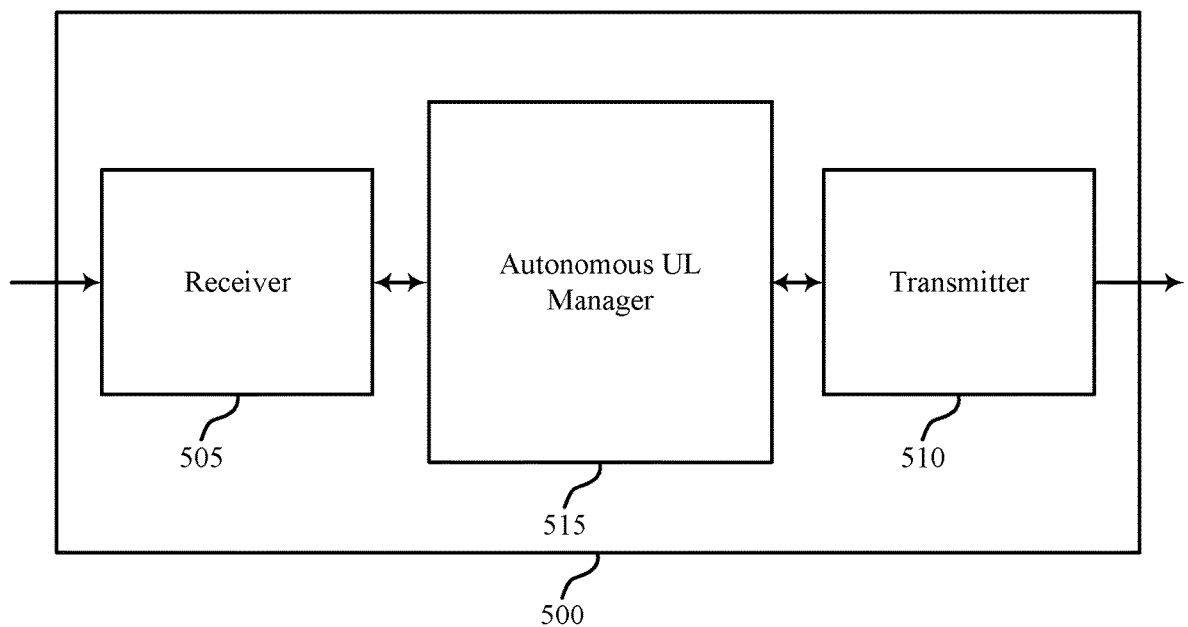
FIGS. 5 through 7 show block diagrams of a wireless device that supports autonomous UL transmission in unlicensed spectrum in accordance with aspects of the present disclosure.

FIG. 5 shows a block diagram of a wireless device 500 that supports autonomous UL transmission in unlicensed spectrum in accordance with various aspects of the present disclosure. Wireless device 500 may be an example of aspects of a UE 115 described with reference to FIGS. 1 and 2. Wireless device 500 may include receiver 505, transmitter 510 and autonomous UL manager 515. Wireless device 500 may also include a processor. Each of these components may be in communication with each other.

The receiver 505 may receive information such as packets, user data, or control information associated with various information channels (e.g., control channels, data channels, and information related to autonomous UL transmission in unlicensed spectrum, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or it may include a plurality of antennas.

The autonomous UL manager 515 may detect an absence of a control transmission from a base station on a CC in an unlicensed RF spectrum band at a predefined time, perform a LBT procedure based on the detected absence of the control transmission, and transmit an unscheduled UL message on the CC based on the LBT procedure. The autonomous UL manager 515 may also be an example of aspects of the autonomous UL manager 805 described with reference to FIG. 8.

Figure 6:
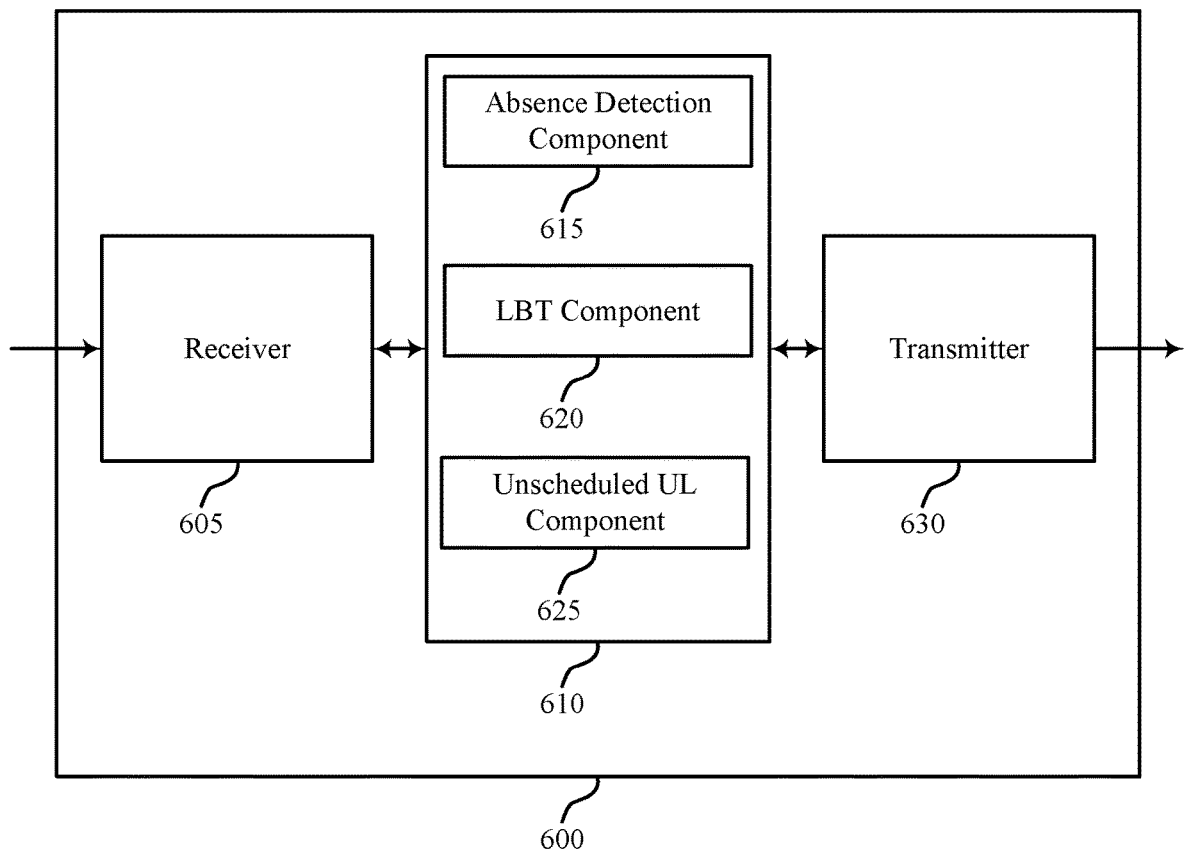

FIG. 6 shows a block diagram of a wireless device 600 that supports autonomous UL transmission in unlicensed spectrum in accordance with various aspects of the present disclosure. Wireless device 600 may be an example of aspects of a wireless device 500 or a UE 115 described with reference to FIGS. 1, 2 and 5. Wireless device 600 may include receiver 605, autonomous UL manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The autonomous UL manager 610 may be an example of aspects of autonomous UL manager 515 described with reference to FIG. 5. The autonomous UL manager 610 may include absence detection component 615, LBT component 620 and unscheduled UL component 625. The autonomous UL manager 610 may be an example of aspects of the autonomous UL manager 805 described with reference to FIG. 8.

The absence detection component 615 may determine whether the base station has transmitted on another CC, where the unscheduled UL message is transmitted based on the determination, and detect an absence of a control transmission from a base station on a CC in an unlicensed RF spectrum band at a predefined time. In some cases, the predefined time comprises a first symbol of a subframe, the LBT procedure is performed during the subframe, and the unscheduled UL message is transmitted during the subframe. In some cases, the control transmission comprises a cell-specific reference signal (CRS), a common PDCCH transmission, or both.

The LBT component 620 may perform a LBT procedure based on the detected absence of the control transmission. The unscheduled UL component 625 may transmit an unscheduled UL message on the CC based on the LBT procedure. In some cases, the unscheduled UL message comprises a UCI portion and a data portion, where the UCI portion comprises MCS information, scrambling information, HARQ process information, or any combination thereof. In some cases, the data portion is transmitted using a time first transmission scheme. In some cases, the UCI portion is transmitted using punctured REs (REs) within the data portion.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
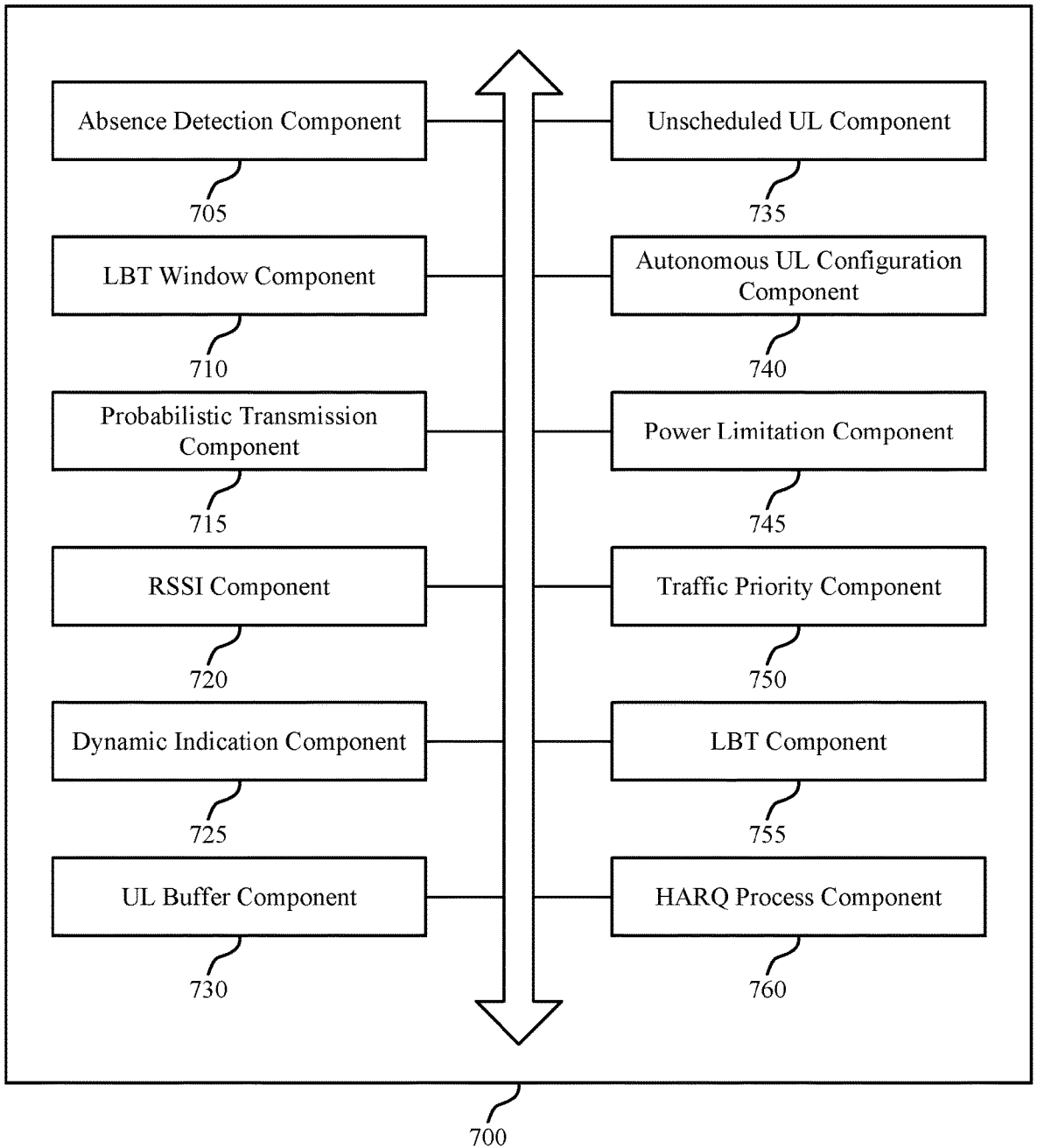

FIG. 7 shows a block diagram of an autonomous UL manager 700 which may be an example of the corresponding component of wireless device 500 or wireless device 600. That is, autonomous UL manager 700 may be an example of aspects of autonomous UL manager 515 or autonomous UL manager 610 described with reference to FIGS. 5 and 6. The autonomous UL manager 700 may also be an example of aspects of the autonomous UL manager 805 described with reference to FIG. 8.

The autonomous UL manager 700 may include absence detection component 705, LBT window component 710, probabilistic transmission component 715, RSSI component 720, dynamic indication component 725, UL buffer component 730, unscheduled UL component 735, autonomous UL configuration component 740, power limitation component 745, traffic priority component 750, LBT component 755 and HARQ process component 760. Each of these modules may communicate, directly or indirectly, with one another (e.g., via one or more buses).

The absence detection component 705 may determine whether the base station has transmitted on another CC, where the unscheduled UL message is transmitted based on the determination, and detect an absence of a control transmission from a base station on a CC in an unlicensed RF spectrum band at a predefined time.

The LBT window component 710 may determine an LBT window based on a slot number, a subframe number, a RNTI, or any combination thereof, where the LBT procedure is performed during the LBT window.

The probabilistic transmission component 715 may identify a probabilistic transmission parameter, where the unscheduled UL message is transmitted based on the probabilistic transmission parameter. The probabilistic transmission parameter may include a number of additional slots autonomous UL manager 700 may wait before transmitting the UL message. The RSSI component 720 may identify a RSSI, where the unscheduled UL message is transmitted based on the RSSI. In some cases, the identified RSSI may indicate a power limitation.

The dynamic indication component 725 may receive a dynamic autonomous UL transmission indication from the base station, where the unscheduled UL message is transmitted based on the dynamic autonomous UL transmission indication. The UL buffer component 730 may determine whether an UL buffer status is below a threshold, where the unscheduled UL message is transmitted based on the determination.

The unscheduled UL component 735 may transmit an unscheduled UL message on the CC based on the LBT procedure. The autonomous UL configuration component 740 may receive a an autonomous UL configuration message from the base station, where the autonomous UL configuration message comprises a scrambling ID, a MIMO indication, a maximum number of autonomous UL subframes, a set of subframes for autonomous UL transmission, a partial subframe indication, an end position indication, or any combination thereof.

The power limitation component 745 may determine whether the transmission of the unscheduled UL message is power limited. An MCS of the unscheduled UL message, a bandwidth of the unscheduled UL message, a number of interlaces for the unscheduled UL message, or any combination thereof may be based at least in part the determination. In some cases, power limitation component 745 may determine power limitation based on an RSSI measurement in a DRS and/or in a CRS measurement in previous downlink subframes The traffic priority component 750 may identify a traffic priority for the unscheduled UL message, where the traffic priority is based on a QCI and the unscheduled UL message is transmitted based on the traffic priority. The LBT component 755 may perform a LBT procedure based on the detected absence of the control transmission.

The HARQ process component 760 may determine that data for an UL HARQ process has been transmitted during an UL burst and that that a grant for the UL HARQ process has not been received following the UL burst, refrain from including data corresponding to the UL HARQ process within the unscheduled UL message based on the determination, determine that data for an UL HARQ process has been in a buffer for a threshold time period, include data corresponding to the UL HARQ process within the unscheduled UL message based on the determination, and receive an ACK or a NACK in a PHICH transmission or a UE specific PDCCH transmission.

Figure 8:
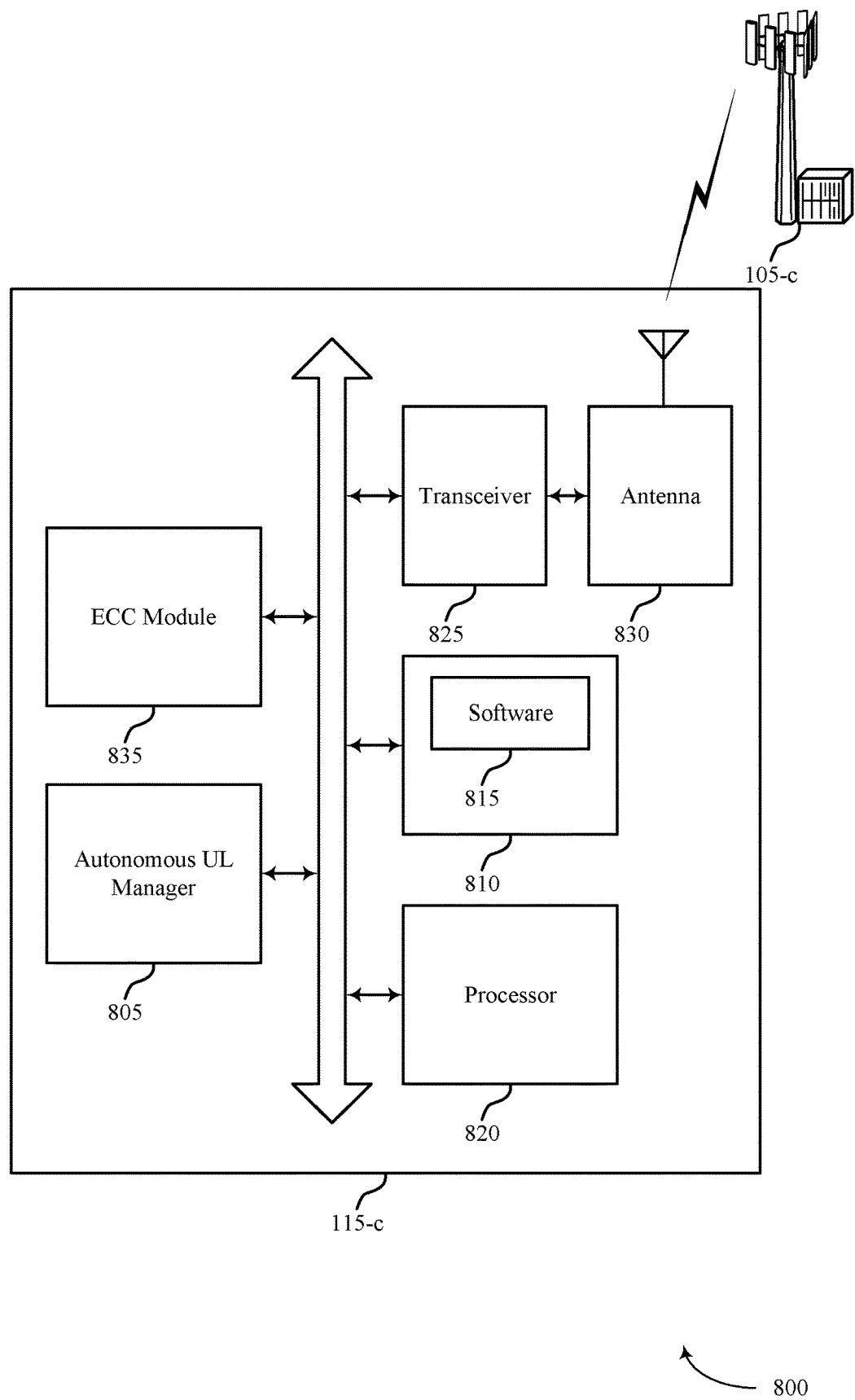
FIG. 8 illustrates a block diagram of a system including a user equipment (UE) that supports autonomous UL transmission in unlicensed spectrum in accordance with aspects of the present disclosure.

FIG. 8 shows a diagram of a system 800 including a device that supports autonomous UL transmission in unlicensed spectrum in accordance with various aspects of the present disclosure. For example, system 800 may include UE 115-*c*, which may be an example of a wireless device 500, a wireless device 600, or a UE 115 as described with reference to FIGS. 1, 2 and 5 through 7.

UE 115-*c* may also include autonomous UL manager 805, memory 810, processor 820, transceiver 825, antenna 830 and ECC module 835. Each of these modules may communicate, directly or indirectly, with one another (e.g., via one or more buses). The autonomous UL manager 805 may be an example of an autonomous UL manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., autonomous UL transmission in unlicensed spectrum, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The ECC module 835 may enable operations using enhanced component carriers (ECCs) such as communication using shared or unlicensed spectrum, using reduced TTIs or subframe durations, or using a large number of component carriers.

Figure 9:
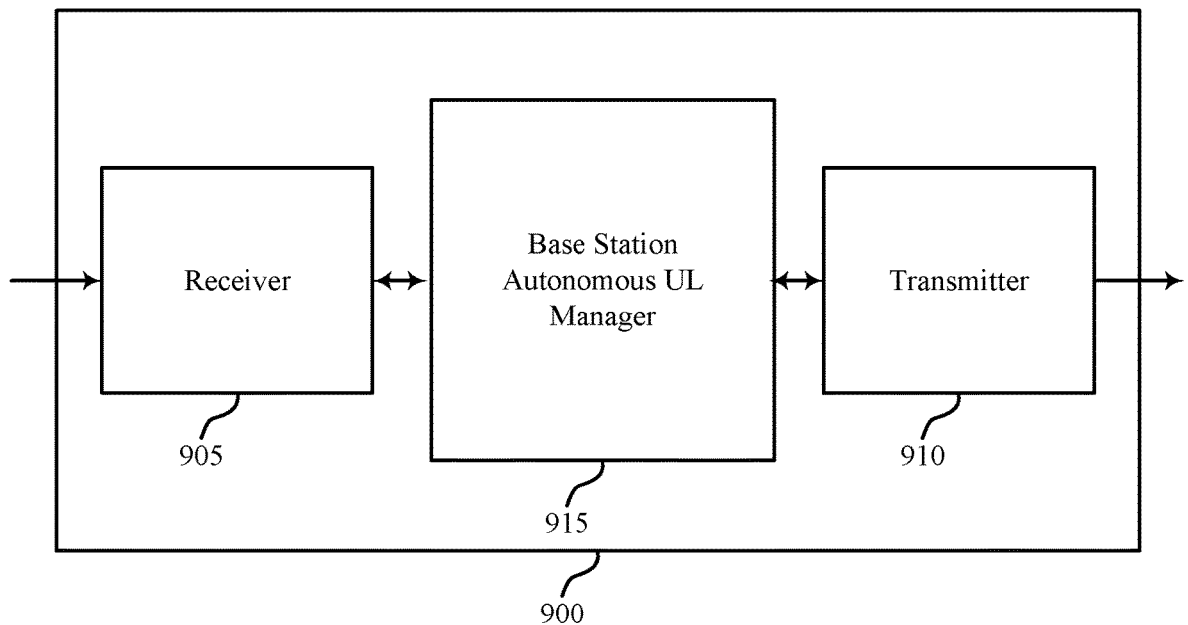
FIGS. 9 through 11 show block diagrams of a wireless device that supports autonomous UL transmission in unlicensed spectrum in accordance with aspects of the present disclosure.

FIG. 9 shows a block diagram of a wireless device 900 that supports autonomous UL transmission in unlicensed spectrum in accordance with various aspects of the present disclosure. Wireless device 900 may be an example of aspects of a base station 105 described with reference to FIGS. 1 and 2. Wireless device 900 may include receiver 905, transmitter 910 and base station autonomous UL manager 915. Wireless device 900 may also include a processor. Each of these components may be in communication with each other.

The receiver 905 may receive information such as packets, user data, or control information associated with various information channels (e.g., control channels, data channels, and information related to autonomous UL transmission in unlicensed spectrum, etc.). Information may be passed on to other components of the device. The receiver 905 may be an example of aspects of the transceiver 1225 described with reference to FIG. 12.

The transmitter 910 may transmit signals received from other components of wireless device 900. In some examples, the transmitter 910 may be collocated with a receiver in a transceiver module. For example, the transmitter 910 may be an example of aspects of the transceiver 1225 described with reference to FIG. 12. The transmitter 910 may include a single antenna, or it may include a plurality of antennas.

The base station autonomous UL manager 915 may receive an unscheduled UL message from a UE, where the unscheduled UL message comprises an UL UCI portion and a data portion, identify one or more transmission parameters based on the UCI portion, decode the data portion using the one or more transmission parameters, transmit an autonomous UL configuration message to a UE, and receive an unscheduled UL message from the UE based on the autonomous UL configuration message. The base station autonomous UL manager 915 may also be an example of aspects of the base station autonomous UL manager 1205 described with reference to FIG. 12.

Figure 10:
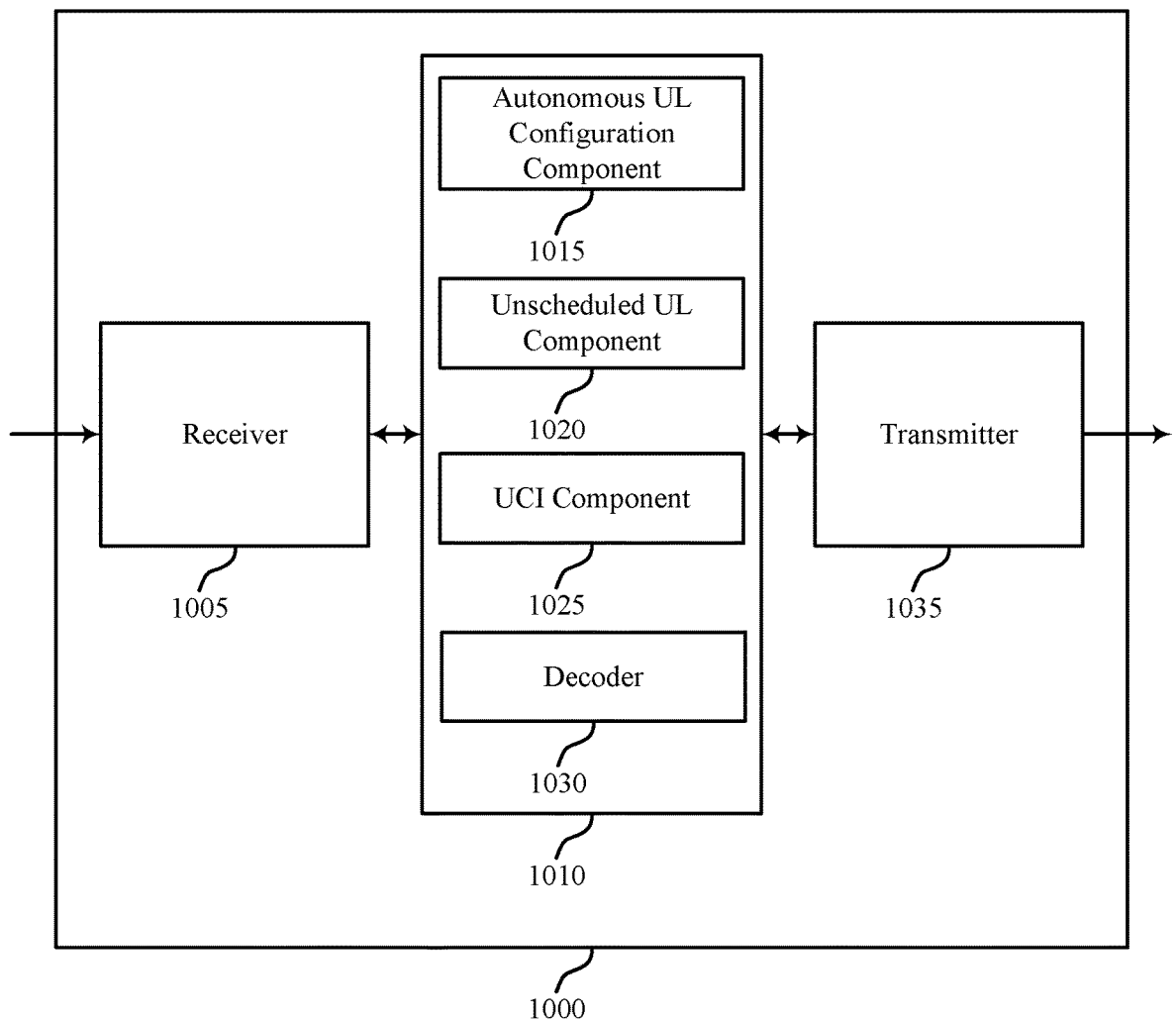

FIG. 10 shows a block diagram of a wireless device 1000 that supports autonomous UL transmission in unlicensed spectrum in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station autonomous UL manager 1010 and transmitter 1035. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station autonomous UL manager 1010 may be an example of aspects of base station autonomous UL manager 915 described with reference to FIG. 9. The base station autonomous UL manager 1010 may include autonomous UL configuration component 1015, unscheduled UL component 1020, UCI component 1025 and decoder 1030. The base station autonomous UL manager 1010 may be an example of aspects of the base station autonomous UL manager 1205 described with reference to FIG. 12.

The autonomous UL configuration component 1015 may transmit an autonomous UL configuration message to a UE. In some cases, the autonomous UL configuration message comprises a scrambling ID, a MIMO indication, a maximum number of autonomous UL subframes, a set of subframes for autonomous UL transmission, a partial subframe indication, an end position indication, a traffic priority or any combination thereof.

The unscheduled UL component 1020 may receive an unscheduled UL message from a UE, where the unscheduled UL message comprises a UCI portion and a data portion, and receive an unscheduled UL message from the UE based on the autonomous UL configuration message.

The UCI component 1025 may identify one or more transmission parameters based on the UCI portion. In some cases, the UCI portion comprises MCS information, scrambling information, HARQ process information, or any combination thereof. The decoder 1030 may decode the data portion using the one or more transmission parameters.

The transmitter 1035 may transmit signals received from other components of wireless device 1000. In some examples, the transmitter 1035 may be collocated with a receiver in a transceiver module. For example, the transmitter 1035 may be an example of aspects of the transceiver 1225 described with reference to FIG. 12. The transmitter 1035 may utilize a single antenna, or it may utilize a plurality of antennas.

Figure 11:
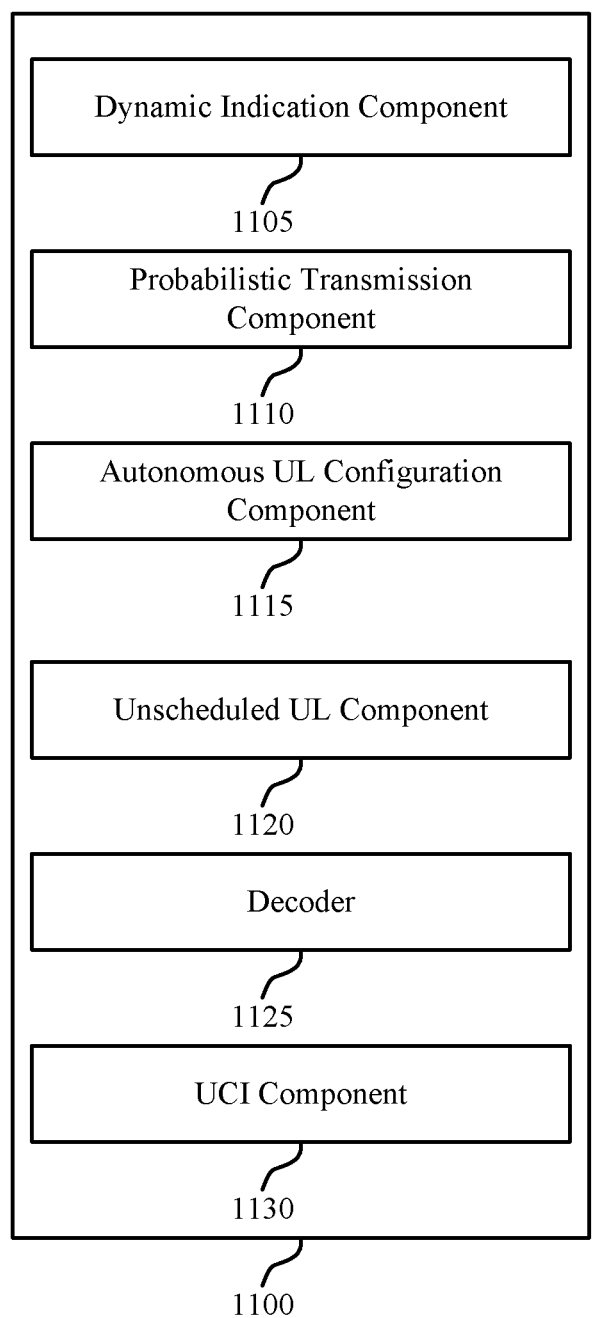

FIG. 11 shows a block diagram of a base station autonomous UL manager 1100 which may be an example of the corresponding component of wireless device 900 or wireless device 1000. That is, base station autonomous UL manager 1100 may be an example of aspects of base station autonomous UL manager 915 or base station autonomous UL manager 1010 described with reference to FIGS. 9 and 10. The base station autonomous UL manager 1100 may also be an example of aspects of the base station autonomous UL manager 1205 described with reference to FIG. 12.

The base station autonomous UL manager 1100 may include dynamic indication component 1105, probabilistic transmission component 1110, autonomous UL configuration component 1115, unscheduled UL component 1120, decoder 1125 and UCI component 1130. Each of these modules may communicate, directly or indirectly, with one another (e.g., via one or more buses).

The dynamic indication component 1105 may transmit a dynamic autonomous UL transmission indication to the UE, where the unscheduled UL message is received based on the dynamic autonomous UL transmission indication. The probabilistic transmission component 1110 may transmit a probabilistic transmission parameter to the UE, where the unscheduled UL message is received based on the probabilistic transmission parameter.

The autonomous UL configuration component 1115 may transmit an autonomous UL configuration message to a UE. In some cases, the autonomous UL configuration message comprises a scrambling ID, a MIMO indication, a maximum number of autonomous UL subframes, a set of subframes for autonomous UL transmission, a partial subframe indication, an end position indication, a traffic priority or any combination thereof.

The unscheduled UL component 1120 may receive an unscheduled UL message from a UE, where the unscheduled UL message comprises a UCI portion and a data portion, and receive an unscheduled UL message from the UE based on the autonomous UL configuration message. The decoder 1125 may decode the data portion using the one or more transmission parameters.

The UCI component 1130 may identify one or more transmission parameters based on the UCI portion. In some cases, the UCI portion comprises MCS information, scrambling information, HARQ process information, or any combination thereof.

Figure 12:
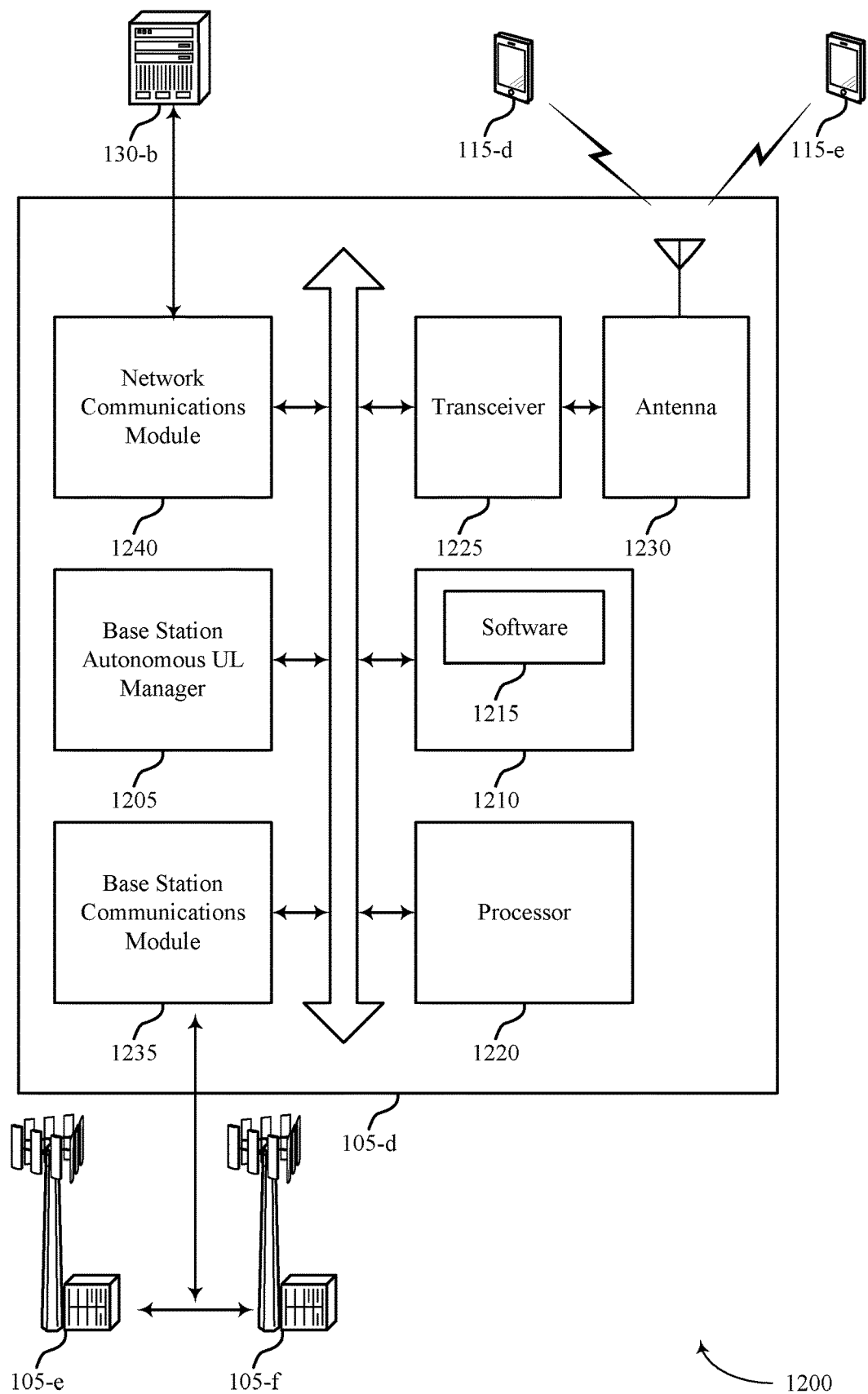
FIG. 12 illustrates a block diagram of a system including a base station that supports autonomous UL transmission in unlicensed spectrum in accordance with aspects of the present disclosure.

FIG. 12 shows a diagram of a wireless system 1200 including a device configured that supports autonomous UL transmission in unlicensed spectrum in accordance with various aspects of the present disclosure. For example, system 1200 may include base station 105-*d*, which may be an example of a wireless device 900, a wireless device 1000, or a base station 105 as described with reference to FIGS. 1, 2 and 9 through 11. Base station 105-*d* may also include components for bi-directional voice and data communications including components for transmitting communications and components for receiving communications. For example, base station 105-*d* may communicate bi-directionally with one or more UEs 115.

Base station 105-*d* may also include base station autonomous UL manager 1205, memory 1210, processor 1220, transceiver 1225, antenna 1230, base station communications module 1235 and network communications module 1240. Each of these modules may communicate, directly or indirectly, with one another (e.g., via one or more buses). The base station autonomous UL manager 1205 may be an example of a base station autonomous UL manager as described with reference to FIGS. 9 through 11.

The memory 1210 may include RAM and ROM. The memory 1210 may store computer-readable, computer-executable software including instructions that, when executed, cause the processor to perform various functions described herein (e.g., autonomous UL transmission in unlicensed spectrum, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module −95 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
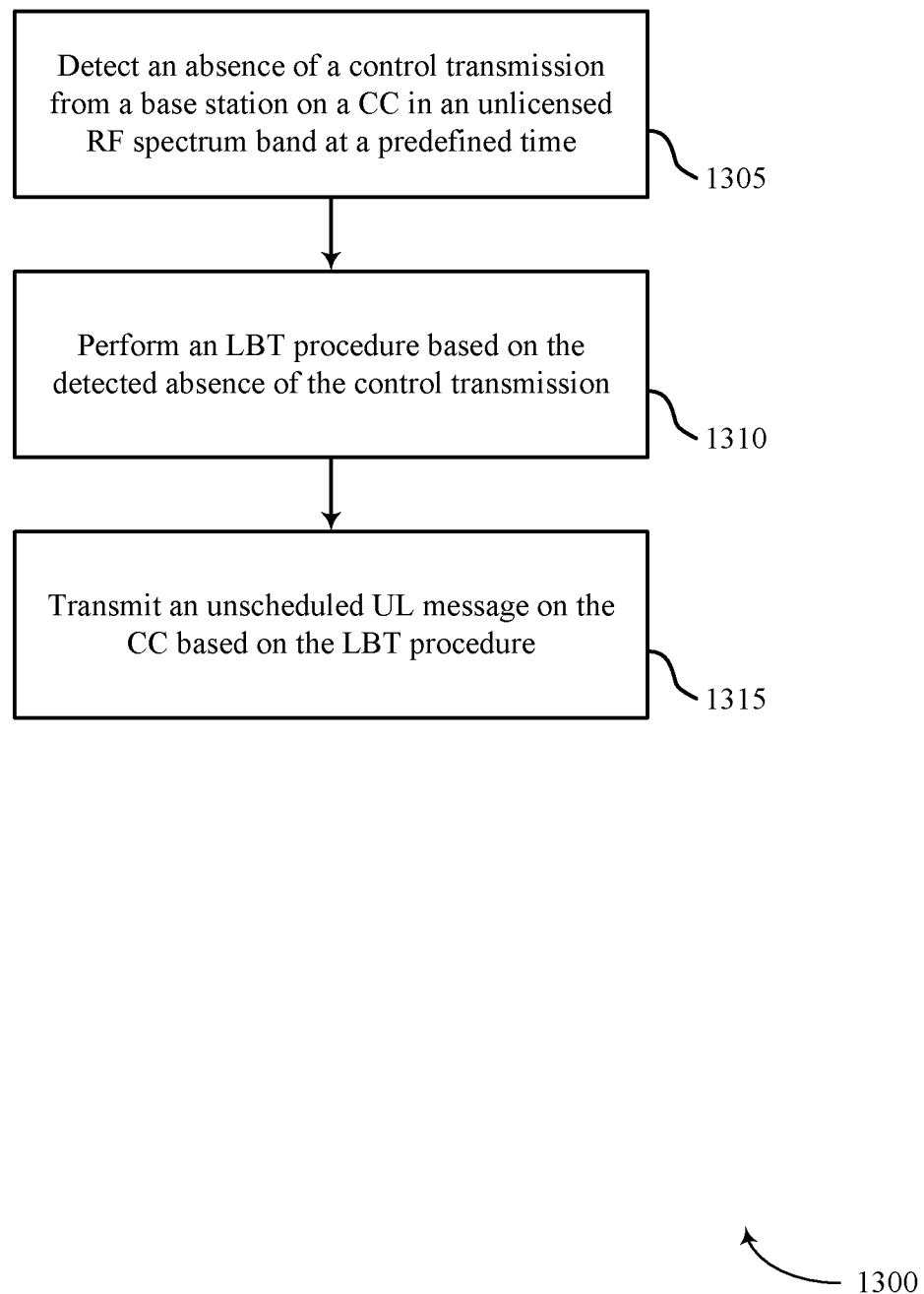
FIGS. 13 through 18 illustrate methods for autonomous UL transmission in unlicensed spectrum in accordance with aspects of the present disclosure.

FIG. 13 shows a flowchart illustrating a method 1300 for autonomous UL transmission in unlicensed spectrum in accordance with various aspects of the present disclosure. The operations of method 1300 may be implemented by a device such as a UE 115 or its components as described with reference to FIGS. 1 and 2. For example, the operations of method 1300 may be performed by the autonomous UL manager as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may detect an absence of a control transmission from a base station on a CC in an unlicensed RF spectrum band at a predefined time as described above with reference to FIGS. 2 through 4. In certain examples, the operations of block 1305 may be performed by the absence detection component as described with reference to FIGS. 6 and 7.

At block 1310, the UE 115 may perform a LBT procedure based on the detected absence of the control transmission as described above with reference to FIGS. 2 through 4. In certain examples, the operations of block 1310 may be performed by the LBT component as described with reference to FIGS. 6 and 7.

At block 1315, the UE 115 may transmit an unscheduled UL message on the CC based on the LBT procedure as described above with reference to FIGS. 2 through 4. In certain examples, the operations of block 1315 may be performed by the unscheduled UL component as described with reference to FIGS. 6 and 7.

Figure 14:
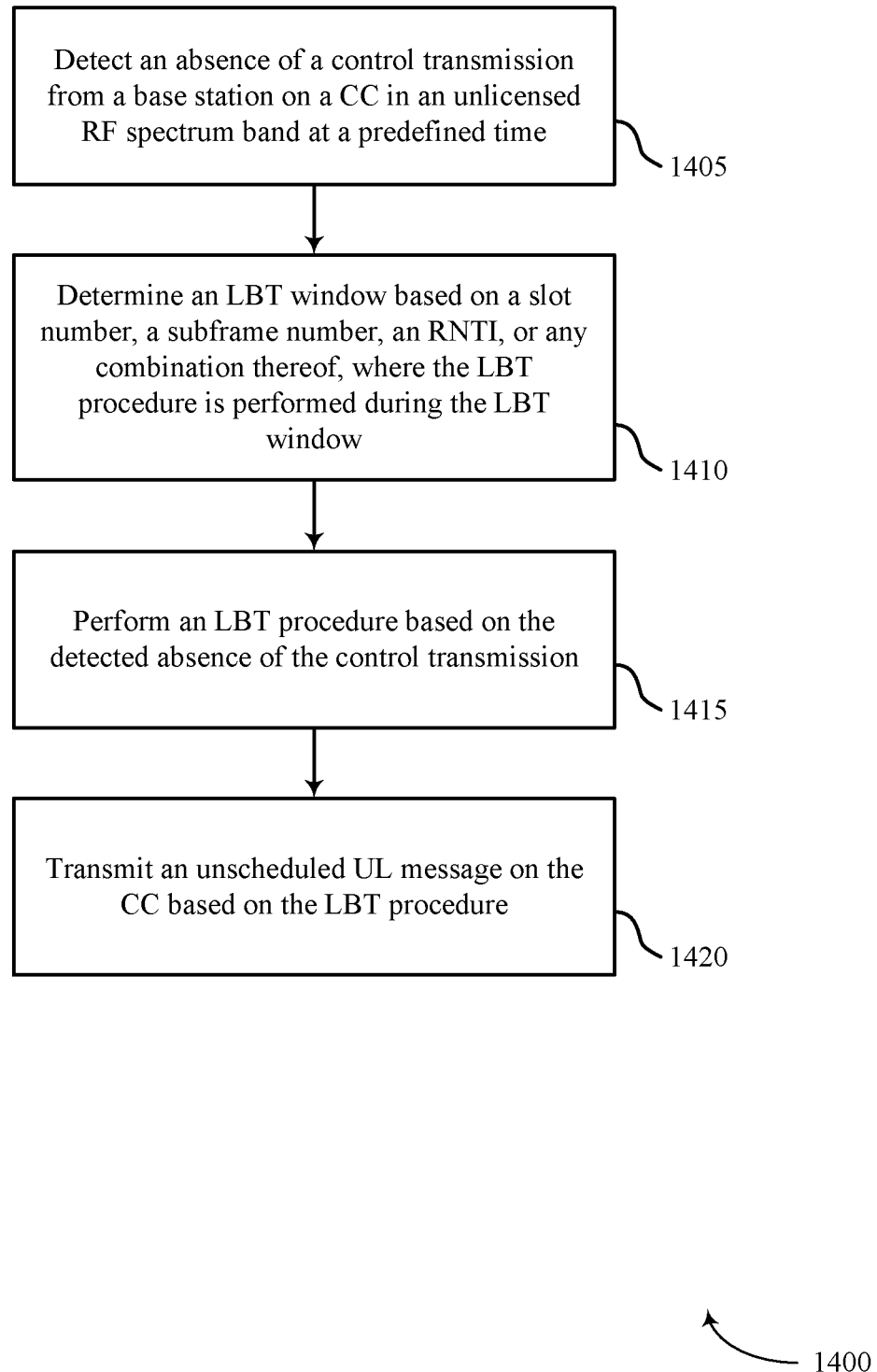

FIG. 14 shows a flowchart illustrating a method 1400 for autonomous UL transmission in unlicensed spectrum in accordance with various aspects of the present disclosure. The operations of method 1400 may be implemented by a device such as a UE 115 or its components as described with reference to FIGS. 1 and 2. For example, the operations of method 1400 may be performed by the autonomous UL manager as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may detect an absence of a control transmission from a base station on a CC in an unlicensed RF spectrum band at a predefined time as described above with reference to FIGS. 2 through 4. In certain examples, the operations of block 1405 may be performed by the absence detection component as described with reference to FIGS. 6 and 7.

At block 1410, the UE 115 may determine an LBT window based on a slot number, a subframe number, a RNTI, or any combination thereof, where the LBT procedure is performed during the LBT window as described above with reference to FIGS. 2 through 4. In certain examples, the operations of block 1410 may be performed by the LBT window component as described with reference to FIGS. 6 and 7.

At block 1415, the UE 115 may perform a LBT procedure based on the detected absence of the control transmission as described above with reference to FIGS. 2 through 4. In certain examples, the operations of block 1415 may be performed by the LBT component as described with reference to FIGS. 6 and 7.

At block 1420, the UE 115 may transmit an unscheduled UL message on the CC based on the LBT procedure as described above with reference to FIGS. 2 through 4. In certain examples, the operations of block 1420 may be performed by the unscheduled UL component as described with reference to FIGS. 6 and 7.

Figure 15:
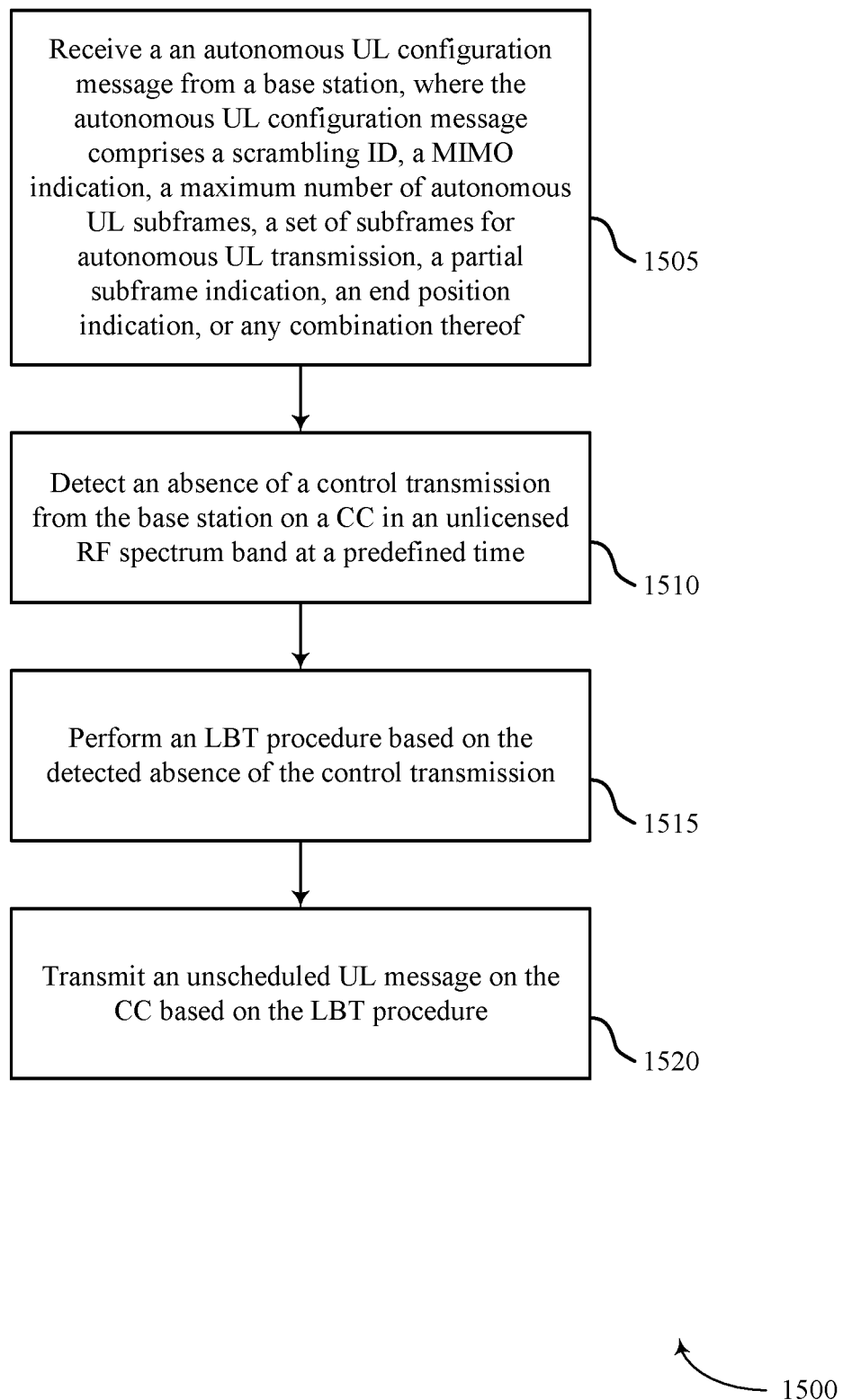

FIG. 15 shows a flowchart illustrating a method 1500 for autonomous UL transmission in unlicensed spectrum in accordance with various aspects of the present disclosure. The operations of method 1500 may be implemented by a device such as a UE 115 or its components as described with reference to FIGS. 1 and 2. For example, the operations of method 1500 may be performed by the autonomous UL manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a an autonomous UL configuration message from the base station, where the autonomous UL configuration message comprises a scrambling ID, a MIMO indication, a maximum number of autonomous UL subframes, a set of subframes for autonomous UL transmission, a partial subframe indication, an end position indication, or any combination thereof as described above with reference to FIGS. 2 through 4. In certain examples, the operations of block 1505 may be performed by the autonomous UL configuration component as described with reference to FIGS. 6 and 7.

At block 1510, the UE 115 may detect an absence of a control transmission from a base station on a CC in an unlicensed RF spectrum band at a predefined time as described above with reference to FIGS. 2 through 4. In certain examples, the operations of block 1510 may be performed by the absence detection component as described with reference to FIGS. 6 and 7.

At block 1515, the UE 115 may perform a LBT procedure based on the detected absence of the control transmission as described above with reference to FIGS. 2 through 4. In certain examples, the operations of block 1515 may be performed by the LBT component as described with reference to FIGS. 6 and 7.

At block 1520, the UE 115 may transmit an unscheduled UL message on the CC based on the LBT procedure as described above with reference to FIGS. 2 through 4. In certain examples, the operations of block 1520 may be performed by the unscheduled UL component as described with reference to FIGS. 6 and 7.

Figure 16:
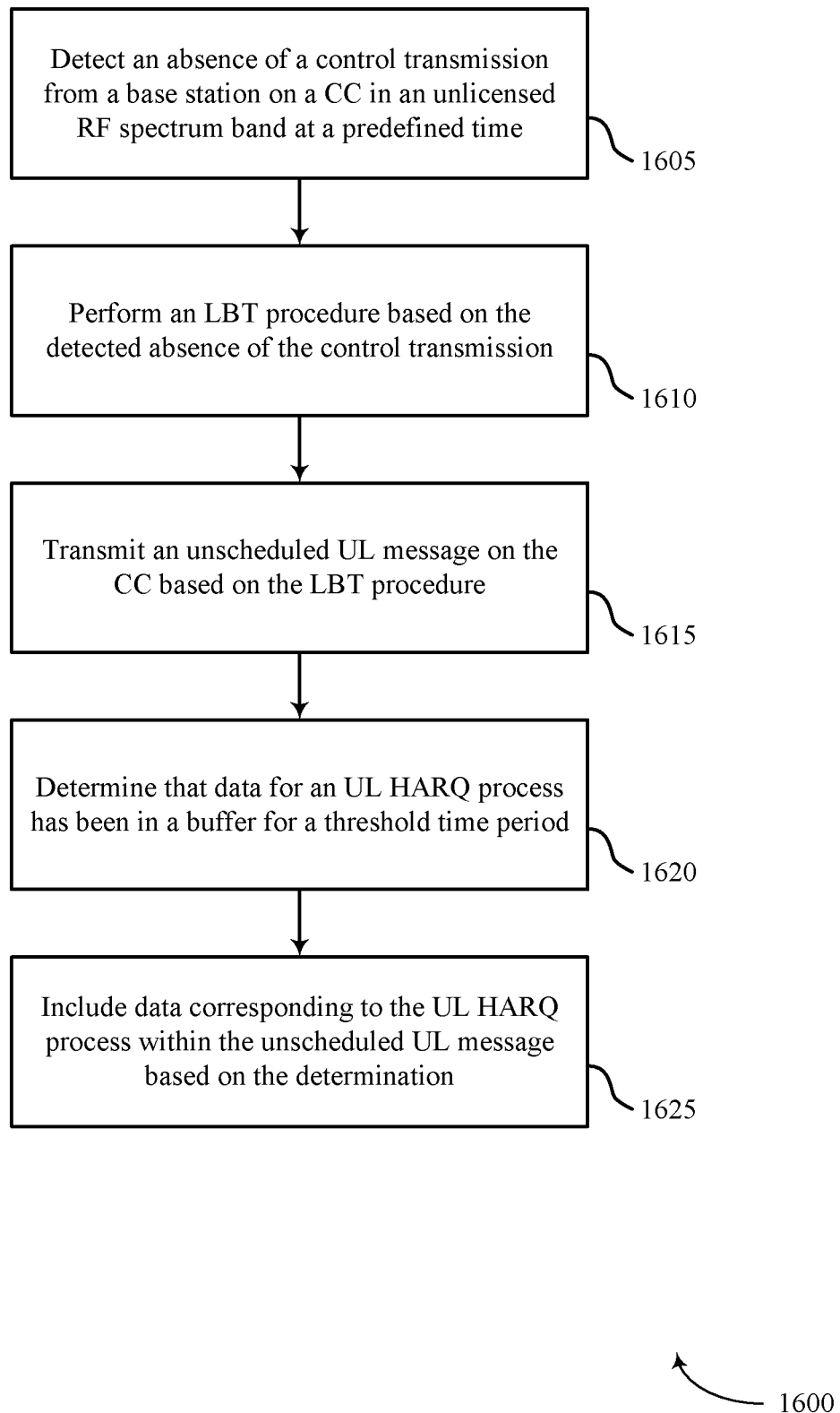

FIG. 16 shows a flowchart illustrating a method 1600 for autonomous UL transmission in unlicensed spectrum in accordance with various aspects of the present disclosure. The operations of method 1600 may be implemented by a device such as a UE 115 or its components as described with reference to FIGS. 1 and 2. For example, the operations of method 1600 may be performed by the autonomous UL manager as described herein. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may detect an absence of a control transmission from a base station on a CC in an unlicensed RF spectrum band at a predefined time as described above with reference to FIGS. 2 through 4. In certain examples, the operations of block 1605 may be performed by the absence detection component as described with reference to FIGS. 6 and 7.

At block 1610, the UE 115 may perform a LBT procedure based on the detected absence of the control transmission as described above with reference to FIGS. 2 through 4. In certain examples, the operations of block 1610 may be performed by the LBT component as described with reference to FIGS. 6 and 7.

At block 1615, the UE 115 may transmit an unscheduled UL message on the CC based on the LBT procedure as described above with reference to FIGS. 2 through 4. In certain examples, the operations of block 1615 may be performed by the unscheduled UL component as described with reference to FIGS. 6 and 7.

At block 1620, the UE 115 may determine that data for an UL HARQ process has been in a buffer for a threshold time period as described above with reference to FIGS. 2 through 4. In certain examples, the operations of block 1620 may be performed by the HARQ process component as described with reference to FIGS. 6 and 7.

At block 1625, the UE 115 may include data corresponding to the UL HARQ process within the unscheduled UL message based on the determination as described above with reference to FIGS. 2 through 4. In certain examples, the operations of block 1625 may be performed by the HARQ process component as described with reference to FIGS. 6 and 7.

Figure 17:
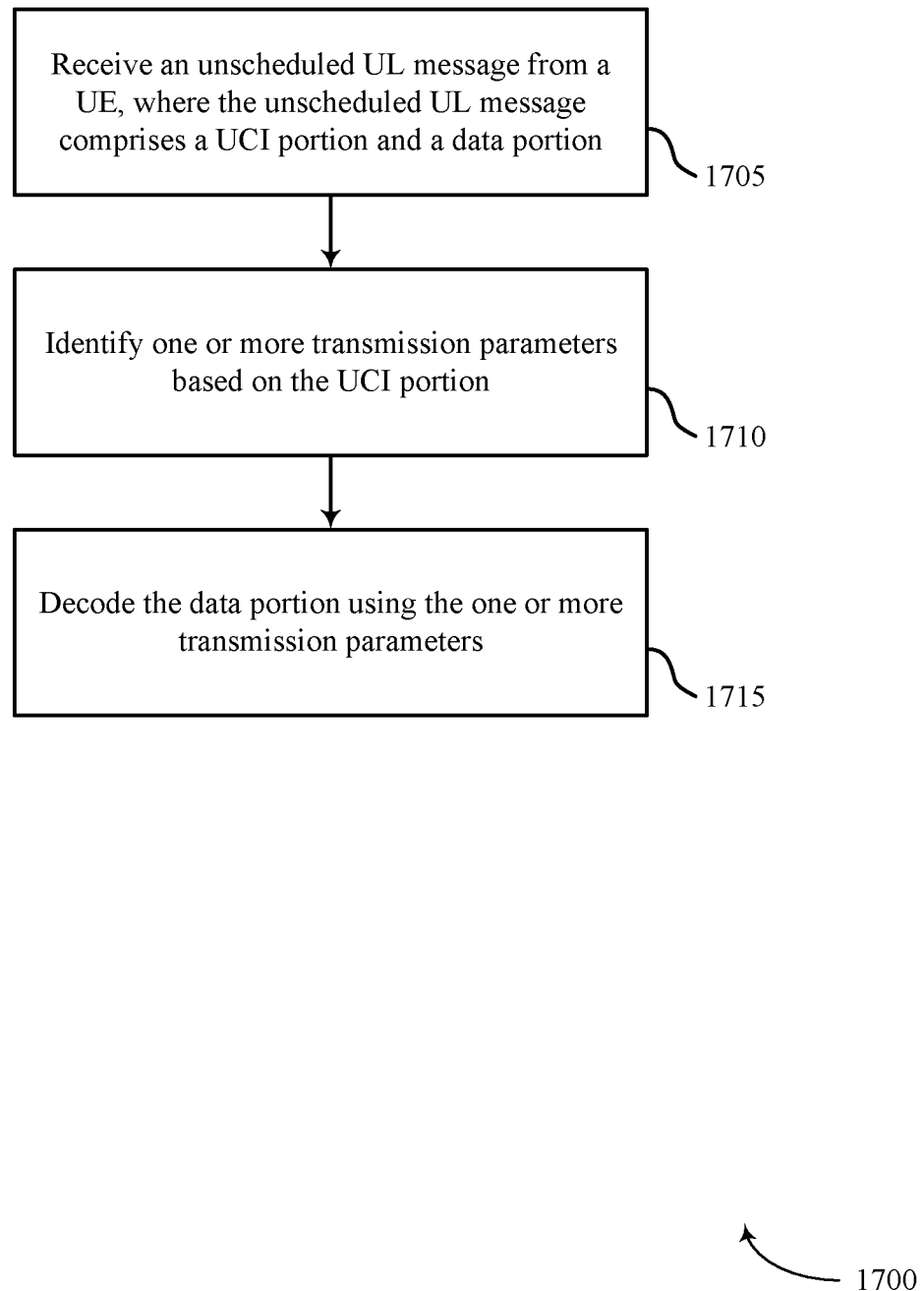

FIG. 17 shows a flowchart illustrating a method 1700 for autonomous UL transmission in unlicensed spectrum in accordance with various aspects of the present disclosure. The operations of method 1700 may be implemented by a device such as a base station 105 or its components as described with reference to FIGS. 1 and 2. For example, the operations of method 1700 may be performed by the base station autonomous UL manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may receive an unscheduled UL message from a UE, where the unscheduled UL message comprises a UCI portion and a data portion as described above with reference to FIGS. 2 through 4. In certain examples, the operations of block 1705 may be performed by the unscheduled UL component as described with reference to FIGS. 10 and 11.

At block 1710, the base station 105 may identify one or more transmission parameters based on the UCI portion as described above with reference to FIGS. 2 through 4. In certain examples, the operations of block 1710 may be performed by the UCI component as described with reference to FIGS. 10 and 11.

At block 1715, the base station 105 may decode the data portion using the one or more transmission parameters as described above with reference to FIGS. 2 through 4. In certain examples, the operations of block 1715 may be performed by the decoder as described with reference to FIGS. 10 and 11.

Figure 18:
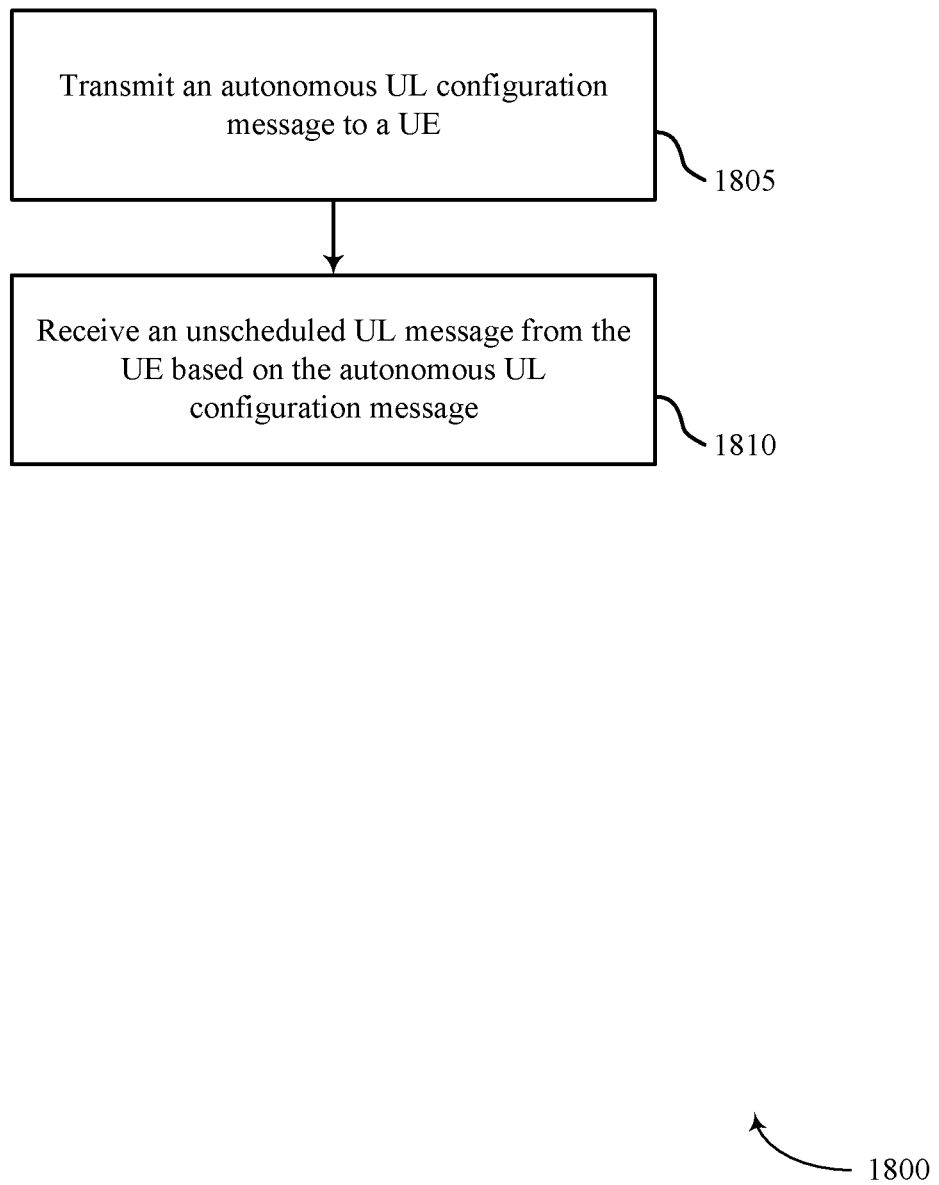

FIG. 18 shows a flowchart illustrating a method 1800 for autonomous UL transmission in unlicensed spectrum in accordance with various aspects of the present disclosure. The operations of method 1800 may be implemented by a device such as a base station 105 or its components as described with reference to FIGS. 1 and 2. For example, the operations of method 1800 may be performed by the base station autonomous UL manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may transmit an autonomous UL configuration message to a UE as described above with reference to FIGS. 2 through 4. In certain examples, the operations of block 1805 may be performed by the autonomous UL configuration component as described with reference to FIGS. 10 and 11.

At block 1810, the base station 105 may receive an unscheduled UL message from the UE based on the autonomous UL configuration message as described above with reference to FIGS. 2 through 4. In certain examples, the operations of block 1810 may be performed by the unscheduled UL component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for autonomous UL transmission in unlicensed spectrum.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for autonomous UL transmission in unlicensed spectrum. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communications at a user equipment (UE), comprising:
   detecting an absence of an uplink grant on a component carrier (CC) in an unlicensed radio frequency (RF) spectrum band at a predefined time during a first portion of a subframe;
   performing a listen-before-talk (LBT) procedure based at least in part on the detected absence of the uplink grant;
   identifying a probabilistic transmission parameter associated with an unscheduled uplink (UL) data message in the unlicensed RF spectrum band; and
   transmitting, during a second portion of the subframe, the unscheduled UL data message on the CC over an uplink shared channel based at least in part on the LBT procedure and the probabilistic transmission parameter.

2. The method of claim 1, wherein the predefined time during the first portion of the subframe comprises a first symbol of the subframe, and wherein the LBT procedure is performed during the subframe.

3. The method of claim 1, further comprising:
   determining an LBT window based at least in part on a slot number, a subframe number, a radio network temporary identity (RNTI), or any combination thereof, wherein the LBT procedure is performed during the LBT window.

4. The method of claim 1, further comprising:
   identifying a received signal strength indication (RSSI), wherein the unscheduled UL data message is transmitted based at least in part on the RSSI.

5. The method of claim 1, further comprising:
   determining whether the base station has transmitted on another CC, wherein the unscheduled UL data message is transmitted based at least in part on the determination.

6. The method of claim 1, further comprising:
   receiving a dynamic autonomous UL transmission indication from the base station, wherein the unscheduled UL data message is transmitted based at least in part on the dynamic autonomous UL transmission indication.

7. The method of claim 1, further comprising:
   determining whether an UL buffer status is below a threshold, wherein the unscheduled UL data message is transmitted based at least in part on the determination.

8. The method of claim 1, wherein the unscheduled UL data message comprises an UL control information (UCI) portion and a data portion, wherein the uplink control information (UCI) portion comprises modulation and coding scheme (MCS) information, scrambling information, hybrid automatic repeat request (HARQ) process information, or any combination thereof.

9. The method of claim 8, wherein the data portion is transmitted using a time first transmission scheme; and wherein the UCI portion is transmitted using punctured resource elements (REs) within the data portion.

10. The method of claim 1, further comprising:
    receiving an autonomous UL configuration message from the base station, wherein the autonomous UL configuration message comprises a scrambling identification (ID), a multiple-input multiple-output (MIMO) indication, a maximum number of autonomous UL subframes, a set of subframes for autonomous UL transmission, a partial subframe indication, an end position indication, or any combination thereof.

11. The method of claim 1, further comprising:
    determining that data for an UL hybrid automatic repeat request (HARQ) process has been transmitted during an UL burst and that a grant for the UL HARQ process has not been received following the UL burst; and
    refraining from including data corresponding to the UL HARQ process within the unscheduled UL data message based at least in part on the determination.

12. The method of claim 1, further comprising:
    determining that data for an UL hybrid automatic repeat request (HARQ) process has been in a buffer for a threshold time period; and
    including data corresponding to the UL HARQ process within the unscheduled UL data message based at least in part on the determination.

13. The method of claim 1, further comprising:
    determining whether the transmission of the unscheduled UL data message is power limited, wherein a modulation and coding scheme (MCS) of the unscheduled UL data message, a bandwidth of the unscheduled UL data message, a number of interlaces for the unscheduled UL data message, or any combination thereof is based at least in part the determination.

14. The method of claim 1, further comprising:
    identifying a traffic priority for the unscheduled UL data message, wherein the traffic priority is based on a quality of service (QoS) class indicator (QCI) and the unscheduled UL data message is transmitted based at least in part on the traffic priority.

15. The method of claim 1, further comprising:
    receiving an acknowledgement (ACK) or a negative ACK (HACK) in a physical hybrid automatic repeat request (HARQ) indicator channel (PHICH) transmission or a UE-specific physical downlink control channel (PDCCH) transmission.

16. An apparatus for wireless communications at a user equipment (UE), comprising:
    means for detecting an absence of an uplink grant on a component carrier (CC) in an unlicensed radio frequency (RF) spectrum band at a predefined time during a first portion of a subframe;
    means for performing a listen-before-talk (LBT) procedure based at least in part on the detected absence of the uplink grant;
    means for identifying a probabilistic transmission parameter associated with an unscheduled uplink (UL) data message in the unlicensed RF spectrum band; and
    means for transmitting, during a second portion of the subframe, the unscheduled UL data message on the CC over an uplink shared channel based at least in part on the LBT procedure and the probabilistic transmission parameter.

17. An apparatus for wireless communications at a user equipment (UE), comprising:
    a processor;
    memory in electronic communication with the processor; and
    instructions stored in the memory and operable, when executed by the processor, to cause the apparatus to:
        detect an absence of an uplink grant on a component carrier (CC) in an unlicensed radio frequency (RF) spectrum band at a predefined time during a first portion of a subframe;
        perform a listen-before-talk (LBT) procedure based at least in part on the detected absence of the uplink grant;
        identify a probabilistic transmission parameter associated with an unscheduled uplink (UL) data message in the unlicensed RF spectrum band; and transmit, during a second portion of the subframe, the unscheduled UL data message on the CC over an uplink shared channel based at least in part on the LBT procedure and the probabilistic transmission parameter.

18. The apparatus of claim 17, wherein the predefined time during the first portion of the subframe comprises a first symbol of the subframe, and wherein the LBT procedure is performed during the subframe.

19. The apparatus of claim 17, wherein the instructions are operable to cause the processor to:
determine an LBT window based at least in part on a slot number, a subframe number, a radio network temporary identity (RNTI), or any combination thereof, wherein the LBT procedure is performed during the LBT window.

20. The apparatus of claim 17, wherein the instructions are operable to cause the processor to:
identify a received signal strength indication (RSSI), wherein the unscheduled UL data message is transmitted based at least in part on the RSSI.

21. The apparatus of claim 17, wherein the instructions are operable to cause the processor to:
determine whether the base station has transmitted on another CC, wherein the unscheduled UL data message is transmitted based at least in part on the determination.

22. The apparatus of claim 17, wherein the instructions are operable to cause the processor to:
receive a dynamic autonomous UL transmission indication from the base station, wherein the unscheduled UL data message is transmitted based at least in part on the dynamic autonomous UL transmission indication.

23. The apparatus of claim 17, wherein the instructions are operable to cause the processor to:
determine whether an UL buffer status is below a threshold, wherein the unscheduled UL data message is transmitted based at least in part on the determination.

24. The apparatus of claim 17, wherein the unscheduled UL data message comprises an UL control information (UCI) portion and a data portion, wherein the uplink control information (UCI) portion comprises modulation and coding scheme (MCS) information, scrambling information, hybrid automatic repeat request (HARQ) process information, or any combination thereof; wherein the data portion is transmitted using a time first transmission scheme; and wherein the UCI portion is transmitted using punctured resource elements (REs) within the data portion.

25. The apparatus of claim 17, wherein the instructions are operable to cause the processor to:
receive an autonomous UL configuration message from the base station, wherein the autonomous UL configuration message comprises a scrambling identification (ID), a multiple-input multiple-output (MIMO) indication, a maximum number of autonomous UL subframes, a set of subframes for autonomous UL transmission, a partial subframe indication, an end position indication, or any combination thereof.

26. The apparatus of claim 17, wherein the instructions are operable to cause the processor to:
determine that data for an UL hybrid automatic repeat request (HARQ) process has been transmitted during an UL burst and that a grant for the UL HARQ process has not been received following the UL burst; and
refrain from including data corresponding to the UL HARQ process within the unscheduled UL data message based at least in part on the determination.

27. The apparatus of claim 17, wherein the instructions are operable to cause the processor to:
determine that data for an UL hybrid automatic repeat request (HARQ) process has been in a buffer for a threshold time period; and
include data corresponding to the UL HARQ process within the unscheduled UL data message based at least in part on the determination.

28. A non-transitory computer-readable medium storing instructions executable by a processor, comprising:
instructions to detect an absence of an uplink grant on a component carrier (CC) in an unlicensed radio frequency (RF) spectrum band at a predefined time during a first portion of a subframe;
instructions to perform a listen-before-talk (LBT) procedure based at least in part on the detected absence of the uplink grant;
instructions to identify a probabilistic transmission parameter associated with an unscheduled uplink (UL) data message in the unlicensed RF spectrum band; and
instructions to transmit, during a second portion of the subframe, the unscheduled UL data message on the CC over an uplink shared channel based at least in part on the LBT procedure and the probabilistic transmission parameter.

* * * * *